United States Patent [19]

Ohta

[11] Patent Number: 5,636,961
[45] Date of Patent: Jun. 10, 1997

[54] CASSETTE

[75] Inventor: Yasunori Ohta, Kanagawa-ken, Japan

[73] Assignee: Fuji Photo Film Co., Ltd., Kanagawa, Japan

[21] Appl. No.: 310,089

[22] Filed: Sep. 22, 1994

Related U.S. Application Data

[62] Division of Ser. No. 40,988, Mar. 31, 1993, Pat. No. 5,379,997.

[30] Foreign Application Priority Data

| Mar. 31, 1992 | [JP] | Japan | 4-75078 |
| Apr. 16, 1992 | [JP] | Japan | 4-96573 |
| Apr. 30, 1992 | [JP] | Japan | 4-111256 |
| Jul. 1, 1992 | [JP] | Japan | 4-174192 |
| Jul. 2, 1992 | [JP] | Japan | 4-175340 |

[51] Int. Cl.[6] ................................ B65B 69/00
[52] U.S. Cl. ............ 414/411; 414/416; 378/188; 206/455; 206/804
[58] Field of Search ............... 414/411, 416, 414/417; 271/145, 147, 160, 164; 206/449, 455, 804; 378/182, 188

[56] References Cited

U.S. PATENT DOCUMENTS

| 2,056,279 | 10/1936 | Kulick | 378/188 X |
| 3,105,903 | 10/1963 | Sano et al. | 414/411 |
| 3,704,369 | 11/1972 | Paidosh | 378/188 |
| 3,720,408 | 3/1973 | Horn | 271/147 X |
| 3,857,040 | 12/1974 | Zwettler et al. | 378/182 |
| 4,249,819 | 2/1981 | Boser et al. | 414/411 X |
| 4,258,264 | 3/1981 | Kotera et al. | |
| 4,365,793 | 12/1982 | Van Blokland et al. | 414/411 X |
| 4,434,501 | 2/1984 | Pfeiffer | 378/188 X |
| 4,493,417 | 1/1985 | Ackeret | 206/804 X |
| 4,788,810 | 12/1988 | Bauer et al. | 414/411 X |
| 4,889,233 | 12/1989 | Torii | 206/455 |
| 4,895,357 | 1/1990 | Lippold | 271/145 |
| 5,029,838 | 7/1991 | Kunihiro | 271/147 X |
| 5,222,725 | 6/1993 | Kasahara et al. | 271/160 |

FOREIGN PATENT DOCUMENTS

| 460806 | 10/1913 | France | 206/449 |
| 3114258 | 11/1982 | Germany | 378/182 |
| 11395 | 2/1981 | Japan . | |
| 178234 | 11/1982 | Japan . | |
| 0203931 | 10/1985 | Japan | 378/188 |
| 2096354 | 4/1981 | United Kingdom . | |

*Primary Examiner*—James W. Keenan
*Attorney, Agent, or Firm*—Sughrue, Mion, Zinn, Macpeak & Seas

[57] ABSTRACT

A cassette comprises a movable member supported on a box member for movement in a direction normal to an swing axis, around which a cover member swings, and an engaging claw combined with the movable member. The movable member is urged to one side of the direction along which the movable member moves. A stopper secured to the box member receives the urged movable member and holds it at a locking position. An engaged claw, which is mounted on the cover member, is engaged with the engaging claw of the movable member located at the locking position and locks the cover member when it is closed. The engaged claw is disengaged from the engaging claw when the movable member moves a predetermined distance oppositely to the direction of the urging of the movable member. A cover opening mechanism is constituted of a pushing member mounted on the movable member and a pushed member mounted on the cover member. The pushing member and/or the pushed member has a slant surface inclined with respect to the direction along which the movable member moves. The pushing member pushes the pushed member to swing the cover member in a direction that opens the cover member when the movable member moves oppositely to the direction of the urging of the movable member.

5 Claims, 23 Drawing Sheets

CASSETTE

This is a divisional of application Ser. No. 08/040,988 filed Mar. 31, 1993 issued as U.S. Pat. No. 5,379,997.

BACKGROUND OF THE INVENTION

1. Field of the Invention

This invention relates to a cassette for housing therein a sheet-shaped image recording medium, such as X-ray photographic film or a stimulable phosphor sheet. This invention also relates to a device for conveying a sheet-shaped image recording medium out of a cassette.

2. Description of the Prior Art

X-ray photographic film has heretofore been known as a recording medium, on which a radiation image of an object, such as a human body, is recorded. Also, as a recording medium used for the same purposes, a sheet provided with a layer of a stimulable phosphor (hereinafter referred to as a stimulable phosphor sheet) has heretofore been known. Such stimulable phosphor sheets are disclosed in, for example, U.S. Pat. No. 4,258,264 and Japanese Unexamined Patent Publication No. 56(1981)-11395. When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

A radiation image of an object is recorded on a stimulable phosphor sheet by, for example, exposing the stimulable phosphor sheet to radiation, which has passed through the object. The stimulable phosphor sheet, on which the radiation image has been stored, is then scanned two-dimensionally with stimulating rays, such as a laser beam, which cause it to emit light in proportion to the amount of energy stored during exposure to the radiation. The light emitted by the stimulable phosphor sheet, upon stimulation thereof, is photoelectrically detected. In this manner, an electric image signal representing the radiation image can be obtained.

Ordinarily, the stimulable phosphor sheet or the X-ray photographic film described above is housed in a light-tight cassette or a light-tight magazine. Each cassette serves to house a single sheet-shaped image recording medium, such as a stimulable phosphor sheet, therein. In general, the cassette is constituted of a box member provided with an opening, through which a recording medium is to be fed into and out of the box member, at a portion, and a cover member, which is mounted on the box member via a swing axis approximately parallel to the sheet-shaped image recording medium having been housed in the box member and which opens and closes the opening by swinging around the swing axis. Such that the cover member may not open unnecessarily, the cassette is provided with a cover locking mechanism constituted of an engaging means, which is mounted on the box member, and an engaged means, which is mounted on the cover member and engaged with the engaging means.

When the cassette is used during an operation for recording a radiation image on the stimulable phosphor sheet, or the like, the cassette is located at a position for exposure to, for example, radiation having passed through an object. The stimulable phosphor sheet, or the like, which has been housed in the cassette, is exposed to radiation, and a radiation image is thereby recorded thereon.

When a cassette is loaded to an radiation image read-out apparatus for reading out a radiation image from, for example, a stimulable phosphor sheet on which the radiation image has been stored, it is necessary to release the lock of the cover member and then to move the cover member to a cover open position such that the housed recording medium may be taken out of the cassette or such that a new recording medium may be housed in the cassette. For that the working efficiency be high, it is desired that the operation for releasing the lock of the cover member and the operation for opening the cover member can be carried out automatically. A cassette wherein these two operations can be carried out automatically is disclosed in, for example, Japanese Unexamined Patent Publication No. 57(1982)-178234.

In the disclosed cassette, a movable member, which is located on the side of a box member and moves in a direction approximately parallel to the sheet-shaped image recording medium by receiving force from the exterior, and a cover member are connected with each other by an arm. When the cover member has been closed, the arm is approximately parallel to the direction, along which the movable member moves. The arm is pushed by the movable member, which moves with external force, and raised to an oblique orientation, and the cover member is thereby swung to a cover open position.

However, with the disclosed cassette, the arm is located in the box member which is usually as thin as approximately 15 mm. Therefore, it is very difficult to design the arm such that the arm may rise obliquely when being pushed. Also, even if the arm were designed in such a manner, a very large force would be required to push the arm and raise it to an oblique orientation. As described above, though the conventional cassette will theoretically enable an automatic cover opening operation, an automatic cover opening operation cannot practically be accomplished.

SUMMARY OF THE INVENTION

The primary object of the present invention is to provide a cassette wherein, even if a box member is very thin, both an operation for releasing the lock of a cover member and an operation for opening the cover member can be carried out automatically.

Another object of the present invention is to provide a device for conveying an image recording medium out of a cassette, which quickly takes a sheet-shaped image recording medium out of a cassette, which is small in size, and the cost of which device is low.

A further object of the present invention is to provide a cassette, which makes it unnecessary for a cassette utilizing apparatus to be provided with a sheet take-out means, and which quickly and simultaneously carries out operations for opening a cover member and discharging an image recording medium.

A still further object of the present invention is to provide a cassette, wherein an image recording medium is slightly, reliably, and quickly fed out of a box member when the cassette is loaded to a cassette utilizing apparatus, wherein the image recording medium is reliably and quickly housed in the box member when the image recording medium is fed into the box member, and wherein no driving means is required to carry out such operations.

Another object of the present invention is to provide a cassette, wherein an image recording medium is slightly, reliably, and quickly fed out of a box member when the cassette is loaded to a cassette utilizing apparatus, wherein the image recording medium is reliably and quickly housed in the box member when the image recording medium is fed into the box member, wherein no driving means is required to carry out such operations, and wherein no limitation is imposed on the direction along which the cassette is loaded to and removed from a cassette utilizing apparatus.

The present invention provides a first cassette comprising:
i) a box member for housing a sheet-shaped image recording medium therein, the box member being provided with an opening, through which the image recording medium is to be fed into and out of the box member, at a portion, and
ii) a cover member, which is mounted on the box member via a swing axis approximately parallel to the image recording medium having been housed in the box member and which opens and closes the opening by swinging around the swing axis,
wherein the improvement comprises the provision of:
a) a movable member, which is supported on the box member and can move in a direction normal to the swing axis,
b) an engaging means combined integrally with the movable member,
c) an urging means for urging the movable member in the direction along which the movable member moves,
d) a stopper secured to the box member in order to receive the urged movable member and to hold it at a locking position,
e) an engaged means, which is mounted on the cover member, which is engaged with the engaging means of the movable member located at the locking position and locks the cover member, such that the cover member cannot swing, when the cover member is located at a cover closed position, and which is disengaged from the engaging means when the movable member moves a predetermined distance in a direction opposite to the direction of the urging of the movable member, and
f) a cover opening mechanism constituted of a pushing member, which is mounted on the movable member, and a pushed member, which is mounted on the cover member, at least either one of the pushing member and the pushed member having a slant surface inclined with respect to the direction along which the movable member moves, the pushing member pushing the pushed member in order to swing the cover member in a direction that opens the cover member when the movable member moves in the direction opposite to the direction of the urging of the movable member.

When the first cassette in accordance with the present invention is loaded to, for example, a radiation image read-out apparatus for reading out a radiation image from a stimulable phosphor sheet, the movable member is pushed by a member of the apparatus against the urging force of the urging means. In this manner, the movable member is retracted from the locking position. As a result, engagement of the engaging means of the movable member and the engaged means of the cover member is released, and the lock of the cover member is thereby released automatically.

Also, when the movable member thus moves, the pushing member mounted on the movable member pushes the pushed member mounted on the cover member. Therefore, the cover member is caused to swing in the direction that opens the cover member, and the cover opening operation is thereby carried out automatically. More specifically, when the pushing member thus pushes the pushed member, the linear motion of the pushing member (i.e., of the movable member) is converted by the slant surface, which is formed on at least either one of the pushing member and the pushed member, into the swing motion of the pushed member (i.e., of the cover member). Unlike the arm of the conventional cassette, which arm is raised to an oblique orientation in the manner described above, the cam mechanism effecting such a cover opening operation in accordance with the present invention can be easily located in a box member having a small thickness of approximately 15 mm. Also, with the cam mechanism of the first cassette in accordance with the present invention, the cover member can be opened with a comparatively small force.

In order to release the lock and open the cover member automatically in the manner described above, a lock releasing member, such as a pin, may be secured to the apparatus, such as a radiation image read-out apparatus, to which the cassette is loaded, such that the lock releasing member can stand facing the movable member provided in the cassette. The cassette is pushed into the apparatus, such as a radiation image read-out apparatus, in a direction parallel to the sheet-shaped image recording medium, which has been housed in the cassette. The cassette is thus loaded to a predetermined position in the apparatus. When the cassette is pushed in this manner into the apparatus, the movable member provided in the cassette is brought into contact with the lock releasing member and is thereby moved in the direction opposite to the direction of the urging of the movable member. Alternatively, after the cassette is loaded to the predetermined position in the apparatus, such as a radiation image read-out apparatus, a movable lock releasing member provided in the apparatus may move in order to move the movable member provided in the cassette. With the former system, the lock releasing operation and the cover opening operation can be carried out by utilizing the cassette loading operation, and therefore no driving mechanism is required for the lock releasing operation and the cover opening operation. Also, these two operations are completed before or when the loading of the cassette to the apparatus is finished. Accordingly, the former system is more advantageous than the latter.

The present invention also provides a device for conveying an image recording medium out of a cassette composed of:
i) a box member for housing a sheet-shaped image recording medium therein, the box member being provided with an opening, through which the image recording medium is to be fed into and out of the box member, at a portion, and
ii) a cover member, which is mounted on the box member via a swing axis approximately parallel to the image recording medium having been housed in the box member and which opens and closes the opening by swinging around the swing axis,
the device comprising:
a) a sheet take-out mechanism, which moves between a waiting position that is spaced apart from the cassette and a take-out position that is in contact with the image recording medium in the cassette for the image recording medium to be taken out, and
b) a cover opening mechanism, which receives the force of movement of the sheet take-out mechanism from the waiting position to the take-out position and which is thereby activated to open the cover member before the sheet take-out mechanism reaches the take-out position.

With the device for conveying an image recording medium out of a cassette in accordance with the present invention, the cover opening mechanism opens the cover member of the cassette before the sheet take-out mechanism reaches the take-out position. Specifically, part of the cover opening operation and part of the sheet take-out operation are carried out simultaneously. Therefore, the conveyance of the image recording medium out of the cassette can be carried out more quickly than with a conventional device wherein a sheet take-out operation begins after a cover member has been opened completely.

Also, the sheet take-out mechanism and the cover opening mechanism are mechanically interlocked with each other, and therefore a single driving source may be utilized for the two mechanisms. Accordingly, the size of the apparatus can be kept smaller and the cost thereof can be kept lower than a technique wherein the two mechanisms are mechanically independent of each other.

The present invention further provides a second cassette comprising:
  i) a box member for housing a sheet-shaped image recording medium therein, the box member being provided with an opening, through which the image recording medium is to be fed into and out of the box member, at a portion, and
  ii) a cover member, which opens and closes the opening of the box member,
wherein the improvement comprises the provision of:
  a) a cover opening mechanism, which is provided with a movable means caused to move by a means located on the side outward from the cassette and which opens the cover member by the movement of the movable means, and
  b) a sheet discharging means, which is interlocked with the movable means and which projects a portion of the image recording medium, that has been housed in the box member, through the opening to the side outward from the box member.

The sheet discharging means may be directly interlocked with the movable means of the cover opening mechanism. Alternatively, the sheet discharging means may be indirectly interlocked with the movable means of the cover opening mechanism via other movable means (e.g., part of a mechanism for releasing the lock of the cover member, or a means for holding the image recording medium in the cassette).

The cover opening mechanism in the second cassette in accordance with the present invention includes a mechanism for moving the cover member to a cover open position and mechanisms for carrying out other relevant operations for opening the cover member (e.g., an operation for releasing the lock of the cover member).

When the second cassette in accordance with the present invention is loaded to a cassette utilizing apparatus, such as a radiation image read-out apparatus, the movable means of the cover opening mechanism is moved by a member located on the side of the apparatus. In this manner, the cover member is opened automatically. In cases where the cover opening mechanism includes the lock releasing mechanism, the lock of the cover member is also released automatically.

When the movable means of the cover opening mechanism is moved in the manner described above, the sheet discharging means of the second cassette interlocked with the movable means is activated simultaneously. Therefore, a portion of the image recording medium is discharged from the cassette simultaneously with the cover opening. The image recording medium, the portion of which has been discharged from the cassette, can then be completely pulled out of the cassette by a conveyance means, which is ordinarily provided in the cassette utilizing apparatus and which may be constituted of nip rollers, or the like. In this manner, the operations from the cassette loading to the takeout of the image recording medium can be carried out quickly.

Also, with the second cassette provided with the sheet discharging means, the cassette utilizing apparatus need not be provided with a sheet take-out means having a driving source. Therefore, the cost of the cassette utilizing apparatus can be kept low. The sheet discharging means is interlocked with the movable means of the cover opening mechanism, and therefore no driving source is required to discharge the image recording medium. Accordingly, the second cassette in accordance with the present invention can be fabricated at a low cost.

The present invention still further provides a third cassette comprising:
  i) a box member for housing a sheet-shaped image recording medium therein, the box member being provided with an opening, through which the image recording medium is to be fed into and out of the box member, at a portion, and
  ii) a cover member, which is mounted on the box member via a swing axis approximately parallel to the image recording medium having been housed in the box member and which opens and closes the opening by swinging around the swing axis,
wherein the improvement comprises the provision of:
  a) a catch shaft, which is located in the vicinity of the opening of the box member and which extends approximately parallel to the swing axis, and
  b) an image recording medium feed-out member, which is flexible, which has one end secured to a position on the cover member, that is spaced apart from the swing axis, and the other end secured to the box member, which is turned up so as to sandwich an end of the image recording medium having been housed in the box member, the end of the image recording medium being located on the side opposite to the opening, and which is located so as to be caught by the catch shaft when the cover member is opened.

The present invention also provides a fourth cassette, wherein the third cassette in accordance with the present invention is modified such that it may further comprise a means for urging the turnup portion of the image recording medium feed-out member, which is flexible, towards the side opposite to the opening of the box member, and a means which is mounted on the image recording medium feed-out member and which adheres to the image recording medium.

In the third and fourth cassettes in accordance with the present invention, the image recording medium feed-out member, which is flexible, may be constituted of a cloth, a synthetic resin film, a thread, or the like.

The present invention further provides a fifth cassette comprising:
  i) a box member for housing a sheet-shaped image recording medium therein, the box member being provided with an opening, through which the image recording medium is to be fed into and out of the box member, at a portion, and
  ii) a cover member, which is mounted on the box member via a swing axis approximately parallel to the image recording medium having been housed in the box member and which opens and closes the opening by swinging around the swing axis, wherein the improvement comprises the provision of:

a) a catch shaft, which is located in the vicinity of the opening of the box member and which extends approximately parallel to the swing axis, and b) an image recording medium feed-out member, which is capable of deforming elastically, which has one end secured to a position on the cover member, that is spaced apart from the swing axis, and the other end releasably adhered to the image recording medium having been housed in the box member, and which is located so as to be caught by the catch shaft when the cover member is opened.

The present invention still further provides a sixth cassette comprising:

i) a box member for housing a sheet-shaped image recording medium therein, the box member being provided with an opening, through which the image recording medium is to be fed into and out of the box member, at a portion, and ii) a cover member, which is mounted on the box member via a swing axis approximately parallel to the image recording medium having been housed in the box member and which opens and closes the opening by swinging around the swing axis, wherein the improvement comprises the provision of:

a) a catch shaft, which is located in the vicinity of the opening of the box member and which extends approximately parallel to the swing axis, and b) an image recording medium feed-out member, which is capable of deforming elastically, which has one end secured to a position on the cover member, that is spaced apart from the swing axis, and the other end engaged with an end of the image recording medium having been housed in the box member, the end of the image recording medium being located on the side opposite to the opening, and which is located so as to be caught by the catch shaft when the cover member is opened.

In the fifth and sixth cassettes in accordance with the present invention, the image recording medium feed-out member, which is capable of deforming elastically, may be constituted of a thin stainless steel sheet, a thin phosphor bronze sheet, a synthetic resin sheet, or the like.

When the third or fourth cassette in accordance with the present invention is loaded to a cassette utilizing apparatus and the cover member is opened, the image recording medium feed-out member, which is flexible and is caught by the catch shaft, is pulled by the cover member towards the side of one end of the image recording medium feed-out member. As a result, the turnup portion of the image recording medium feed-out member moves towards the side of one end of the box member, i.e., towards the opening of the box member. Therefore, the end of the image recording medium is pushed by the turnup portion, and a portion of the image recording medium passes through the opening and is fed out of the cassette.

As described above, the image recording medium feed-out member is constituted of a cloth, a synthetic resin film, or the like, and is flexible. Therefore, when the swing angle of the cover member changes during its opening, the image recording medium feed-out member can bend and can follow up the opening movement of the cover member.

In particular, when a portion of the image recording medium is housed in the fourth cassette in accordance with the present invention and the cover member is closed, the image recording medium feed-out member, which is flexible and the turnup portion of which is urged to the side opposite to the opening of the box member, returns to its original state (i.e., the state which the image recording medium feed-out member took when the cover member was closed completely) in accordance with the cover closing operation. Therefore, the image recording medium adhered to the adhering means mounted on the image recording medium feed-out member moves together with the feed-out member and is completely pulled into the cassette.

When the fifth or sixth cassette in accordance with the present invention is loaded to a cassette utilizing apparatus and the cover member is opened, the image recording medium feed-out member, which is capable of deforming elastically and is caught by the catch shaft, is pulled by the cover member towards the side of one end of the image recording medium feed-out member. As a result, the other end of the image recording medium feed-out member moves towards the side of one end of the box member, i.e., towards the opening of the box member. Therefore, the image recording medium, which is adhered to or engaged with the other end of the feed-out member, is moved towards the opening, and a portion of the image recording medium passes through the opening and is fed out of the cassette.

In particular, when a portion of the image recording medium is housed in the fifth cassette in accordance with the present invention and the cover member is closed, the image recording medium feed-out member is pushed and returned towards the other end thereof by the cover member which is swung in the direction that closes the cover member. In this manner, the other end of the image recording medium feed-out member moves to the side opposite to the opening. Therefore, the image recording medium adhered to the other end of the image recording medium feed-out member is pulled into the cassette and is completely housed therein.

As described above, the image recording medium feed-out member is constituted of a thin stainless steel sheet, a thin phosphor bronze sheet, a synthetic resin sheet, or the like, and is capable of deforming elastically. Therefore, when the swing angle of the cover member changes during its opening or closing, the image recording medium feed-out member can deform elastically and can follow up the movement of the cover member.

As described above, with the third, fourth, fifth, and sixth cassettes in accordance with the present invention, the image recording medium is fed out by utilizing the cover opening operation of the cassette. Therefore, the feeding out of the image recording medium can be carried out simultaneously with the cover opening operation. Accordingly, the operations from the cassette loading to the feeding out of the image recording medium can be carried out quickly. In particular, with the fourth and fifth cassettes in accordance with the present invention, the image recording medium is pulled into the cassette by utilizing the cover closing operation of the cassette, and therefore the housing of the image recording medium can be carried out simultaneously with the cover closing operation. Accordingly, the operations from the housing of the image recording medium to the removal of the cassette from the cassette utilizing apparatus can also be carried out quickly.

Also, the operation for feeding the image recording medium out of the cassette and the operation for pulling the image recording medium thereinto are carried out in the manner described above, and therefore no drive means is required for these operations. Accordingly, with the third to sixth cassettes in accordance with the present invention, the cost of the cassette utilizing apparatus can be prevented from becoming high due to the operation for feeding the image recording medium out of the cassette and the operation for pulling the image recording medium thereinto.

Moreover, with the third to sixth cassettes in accordance with the present invention, the operation for feeding the image recording medium out of the cassette and the operation for pulling the image recording medium thereinto do not rely upon gravity. Therefore, these operations can be carried out reliably.

The present invention also provides a seventh cassette comprising:

i) a box member for housing a sheet-shaped image recording medium therein, one end of the box member being provided with an opening, through which the image recording medium is to be fed into and out of the box member, and ii) a cover member, which opens and closes the opening of the box member, the cassette being loaded into a cassette utilizing apparatus in a direction such that the one end thereof provided with the opening may first enter the cassette utilizing apparatus, the cassette being pulled out of the cassette utilizing apparatus in a direction opposite to the direction, along which the cassette is loaded, during cassette removal, wherein the improvement comprises the provision of:

a) a movable member, which is mounted on the box member and which moves in one direction and in an opposite direction, respectively, by interfering with a member of the cassette utilizing apparatus when the cassette is loaded into the cassette utilizing apparatus and when the cassette is removed therefrom, and b) a sheet transfer mechanism, which is coupled with the movable member and engaged with the image recording medium, which feeds a portion of the image recording medium, that has been housed in the box member, out of the box member through the opening when the movable member moves in the one direction, and which completely pulls the image recording medium, that has been housed in part in the box member through the opening, into the box member when the movable member moves in the opposite direction.

When the seventh cassette in accordance with the present invention is loaded to a cassette utilizing apparatus, the movable member located in the box member moves in one direction. Therefore, by the sheet transfer mechanism which is interlocked with the movable member, a portion of the image recording medium is fed out of the cassette through the opening. When the cassette is removed from the cassette utilizing apparatus, the movable member moves in the opposite direction. Therefore, by the sheet transfer mechanism which is interlocked with the movable member, the image recording medium is completely housed in the cassette.

As described above, with the seventh cassette in accordance with the present invention, the image recording medium is fed out the cassette and pulled thereinto by utilizing the operation for loading the cassette into the cassette utilizing apparatus and the operation for removing the cassette therefrom. Therefore, the feeding out of the image recording medium can be carried out simultaneously with the operation for loading the cassette into the cassette utilizing apparatus. Also, the housing of the image recording medium in the cassette can be carried out simultaneously with the operation for removing the cassette from the cassette utilizing apparatus. Accordingly, the operations from the cassette loading to the feeding out of the image recording medium can be carried out quickly. Also, the operations from the housing of the image recording medium in the cassette to the removal of the cassette from the cassette utilizing apparatus can be carried out quickly. Also, the operation for feeding the image recording medium out of the cassette and the operation for pulling the image recording medium thereinto are carried out in the manner described above, and therefore no drive means is required for these operations. Accordingly, with the seventh cassette in accordance with the present invention, the cost of the cassette utilizing apparatus can be prevented from becoming high due to the operation for feeding the image recording medium out of the cassette and the operation for pulling the image recording medium thereinto.

Moreover, with the seventh cassette in accordance with the present invention, the operation for feeding the image recording medium out of the cassette and the operation for pulling the image recording medium thereinto do not rely upon gravity. Therefore, no limitation is imposed on the direction along which the cassette is loaded to and removed from the cassette utilizing apparatus. Also, the operation for feeding the image recording medium out of the cassette and the operation for pulling the image recording medium thereinto can be carried out reliably.

DESCRIPTION OF THE PREFERRED EMBODIMENTS

The present invention will hereinbelow be described in further detail with reference to the accompanying drawings.

Figure 1:
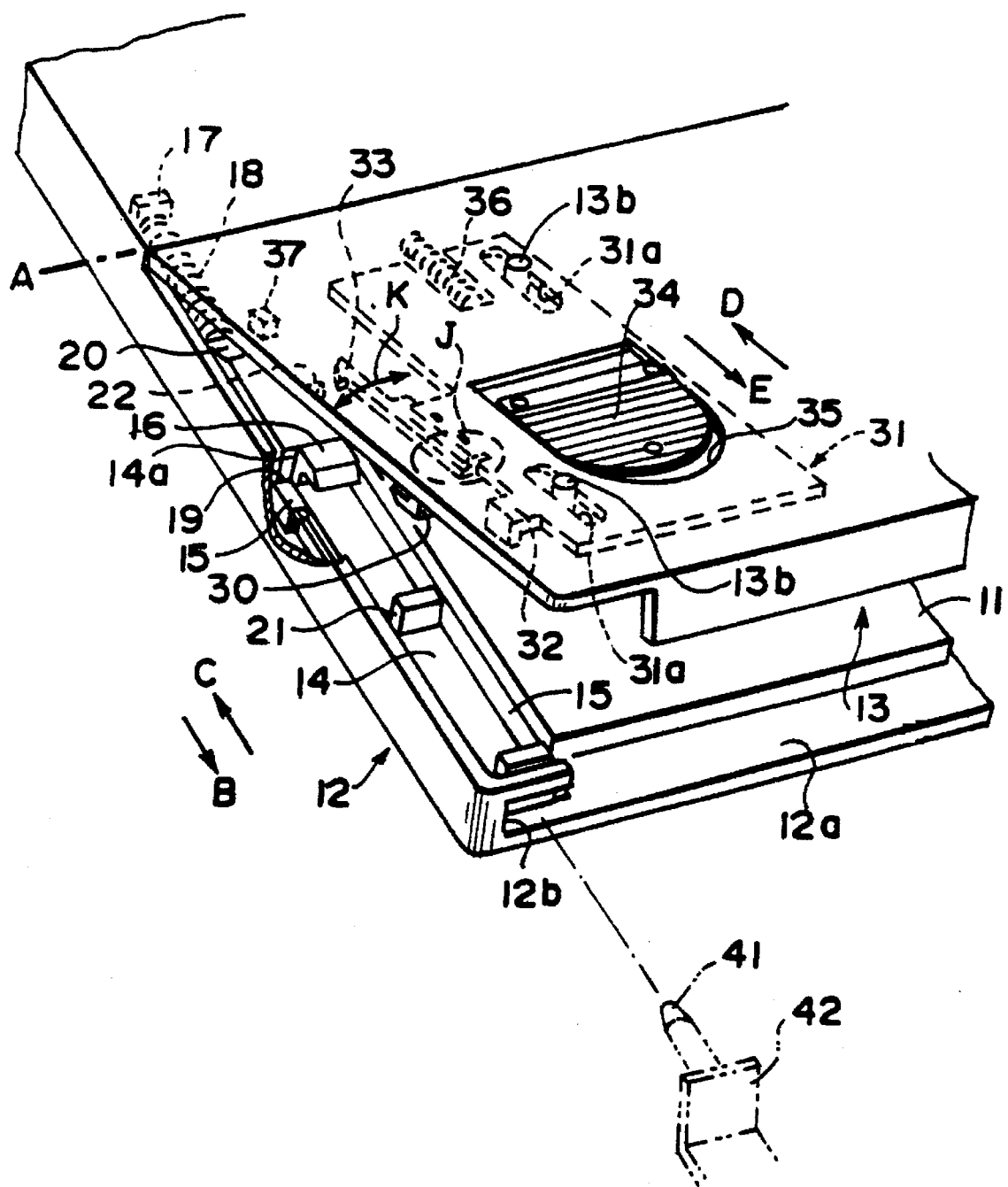
FIG. 1 is a perspective view showing the major part of a first embodiment of the cassette in accordance with the present invention.
Figure 2:
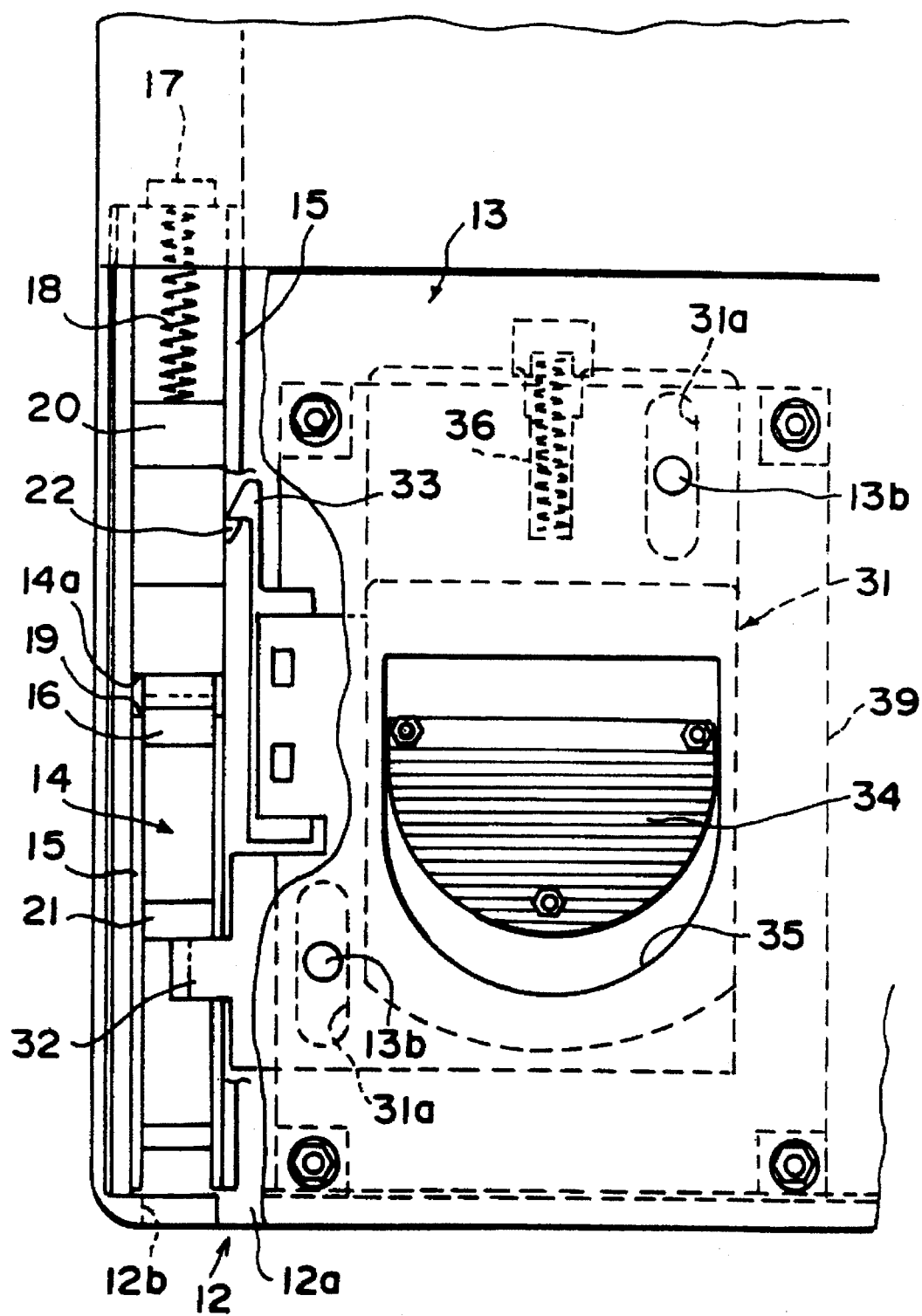
FIG. 2 is a partially cutaway plan view showing the major part of the cassette of FIG. 1, FIGS. 3A, 3B, 3C, and 3D are sectional side views showing how the major part of the cassette of FIG. 1 operates when a cover member of the cassette is opened.

FIG. 1 is a perspective view showing part of a cassette 10, which is a first embodiment of the cassette in accordance with the present invention. FIG. 2 is a partially cutaway plan view showing the part of the cassette shown in FIG. 1.

By way of example, the cassette 10 houses a stimulable phosphor sheet 11 therein and comprises a thin box member 12 and a cover member 13 for opening and closing an opening 12a, which is formed in the box member 12 and through which the stimulable phosphor sheet 11 is to be fed into and out of the box member 12. By way of example, the box member 12 and the cover member 13 are constituted of a synthetic resin. The cover member 13 is mounted on the box member 12 such that the cover member 13 can swing around a swing axis A, which is approximately parallel to the stimulable phosphor sheet 11 having been housed in the box member 12. The cover member 13 opens and closes the opening 12a by swinging in this manner. Such that the cover member 13 can thus swing, for example, a known hinge mechanism may be employed. Alternatively, the box member 12 and the cover member 13 may be integrally molded by using a synthetic resin such that the cover member 13 can be bent along a hinge line with respect to the box member 12.

FIG. 1 shows the state in which the cover member 13 opens the opening 12a (cover open state), and FIG. 2 shows the state in which the cover member 13 closes the opening 12a (cover closed state). In FIG. 2, the lock of the cover member 13 has been released by a manual-operation, which will be described later. Though only the left end portion of the cassette 10 is shown in FIGS. 1 and 2, the same mechanism as that illustrated is also provided at the right end portion of the cassette 10.

In the box member 12, a slider (movable member) 14 is supported such that it can move in the directions indicated by the arrows B and C, which directions are parallel to the housed stimulable phosphor sheet 11 and are normal to the swing axis A of the cover member 13. The slider 14 is guided by, for example, a guide member 15 formed on the inner surface of the box member 12 such that the slider 14 can move only in the directions indicated by the arrows B and C. Also, a locking claw 16 serving as an engaging means is combined integrally with the slider 14.

The box member 12 is provided with a spring shoe 17. A compression coiled spring 18 is located between the spring shoe 17 and the slider 14. The compression coiled spring 18 urges the slider 14 towards the front end of the cassette 10 (i.e. in the direction indicated by the arrow B). When receiving no other external force, the slider 14 thus urged is kept at a position (a locking position) at which an overhang 14a of the slider 14 comes into contact with a stopper 19 formed on the guide member 15. Also, the slider 14 is combined integrally with a pushing member 20 and a protrusion 21, which works during the manual lock releasing operation as will be described later. The upper part of the pushing member 20 is formed as a slant surface which becomes lower at it extends towards the compression coiled spring 18. A latching means 22 for keeping the manual lock releasing state is formed on the side inward from the slider 14 on the box member 12.

How the cover member 13 is constituted will be described hereinbelow. A locking claw 30, which projects towards the upper surface of the slider 14 and serves as an engaged means, and a pushed protrusion 37, which projects in the same manner, are secured to the inner surface of the cover member 13. Also, the cover member 13 is combined with a manual operating piece 31, which can move in the directions indicated by the arrows D and E, i.e. in the directions becoming parallel to the directions indicated by the arrows B and C when the cover member 13 is closed. The manual operating piece 31 is provided with a protrusion 32 projected outwardly from the side of the manual operating piece 31. A latching piece 33 capable of elastically moving in the direction indicated by the arrow K is secured to the manual operating piece 31. Also, an operating means 34 having a wave-like cross-section is formed on the upper surface of the manual operating piece 31. The operating means 34 is exposed to the exterior through an opening 35, which is formed in the cover member 13.

The manual operating piece 31 is supported by a support member 39 (not shown in FIG. 1) such that it can move in the manner described above. The manual operating piece 31 is provided with two elongated guide grooves 31a, 31a, which receives pins 13b, 13b secured to the cover member 13. Therefore, the manual operating piece 31 can move only in the directions indicated by the arrows D and E.

The manual operating piece 31 is urged by a compression coiled spring 36 in the direction indicated by the arrow E. Unless other external force is applied to the thus urged manual operating piece 31, a circular arc edge of the operating means 34 comes into contact with the edge of the opening 35, and the manual operating piece 31 is kept at a predetermined locking position. The locking position is such a position that, when the cover member 13 is closed, a rear end surface of the protrusion 32 of the manual operating piece 31 (i.e., the surface thereof facing the rear of the plane of the sheet of FIG. 1) may stand facing a front end surface of the protrusion 21 of the slider 14 (i.e., the surface thereof facing the front of the plane of the sheet of FIG. 1), which is located at the locking position, with a small space intervening between the two end surfaces.

Figure 3A:
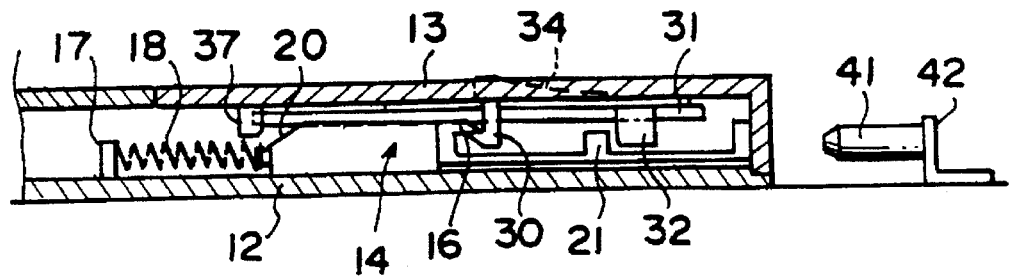

How the cassette 10 operates will be described hereinbelow with reference to FIGS. 3A, 3B, 3C, and 3D and FIG. 4. FIGS. 3A, 3B, 3C, and 3D are sectional side views showing how the parts of the cassette 10 located around the cover locking mechanism operate when the cover member 13 is opened. As illustrated in FIG. 3A, when the stimulable phosphor sheet 11 is housed in the box member 12 and the cover member 13 is closed, the locking claw 30 of the cover member 13 engages with the locking claw 16 of the slider 14, and the cover member 13 is thereby locked so as to keep the cover closed state.

Figure 4:
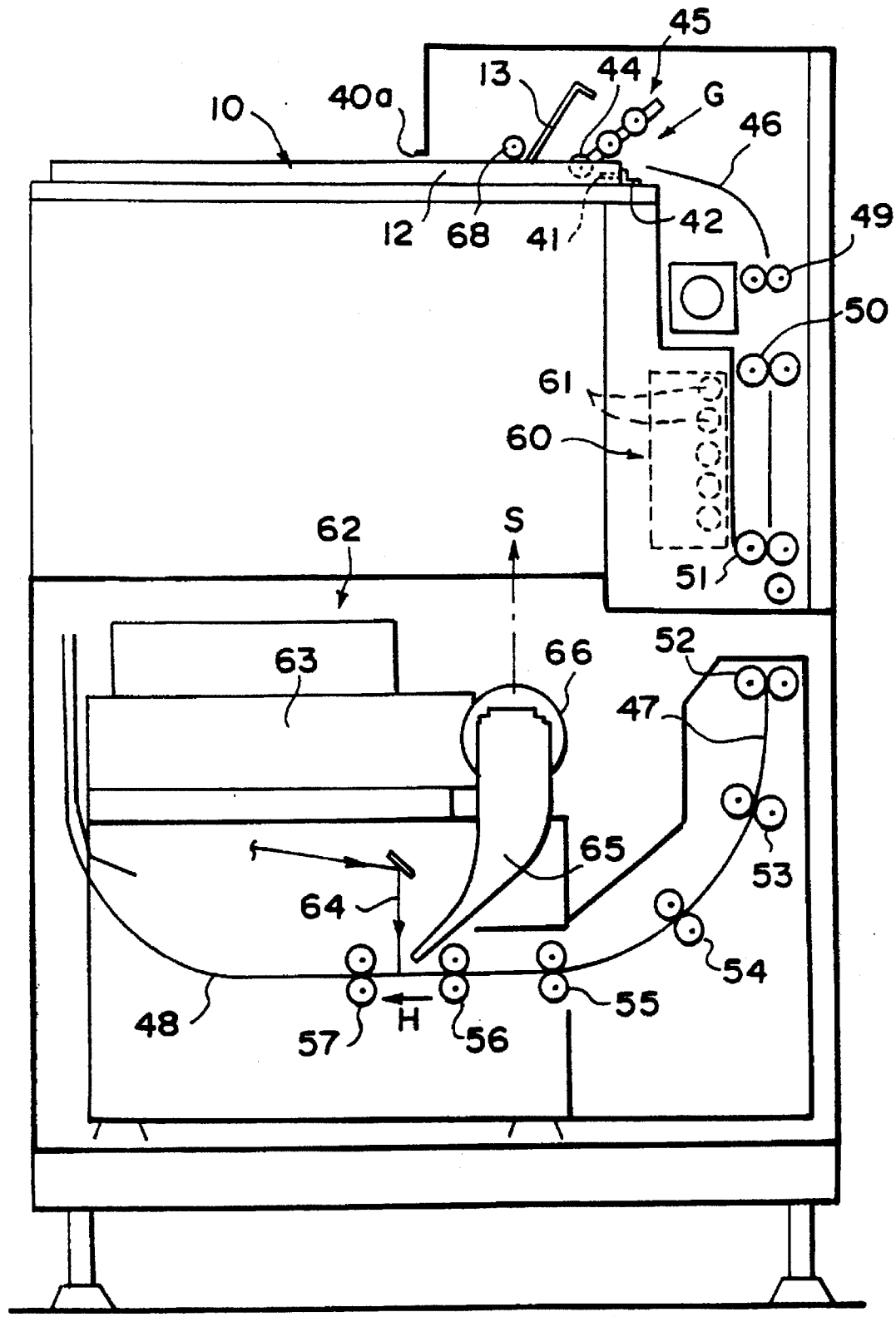
FIG. 4 is a schematic side view showing a radiation image read-out apparatus to which the cassette of FIG. 1 is loaded.

A radiation image is stored on the stimulable phosphor sheet 11 having been housed in the cassette 10, and the cassette 10 is then loaded to a radiation image read-out apparatus 40 shown in FIG. 4. At this time, the cassette 10 is inserted into a cassette receiving port 40a of the radiation image read-out apparatus 40 such that the front end of the cassette 10 (i.e., its end having the opening 12a) may first pass through the cassette receiving port 40a. The cassette 10 is pushed in this orientation to a predetermined loading position. Guide members (not shown) for guiding the two side ends of the cassette 10, which is being pushed in this manner, are provided in the radiation image read-out apparatus 40.

Figure 3B:
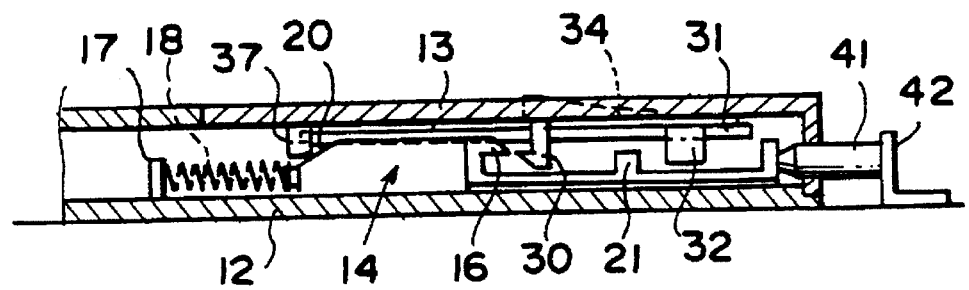

A lock releasing pin 41 is secured to the radiation image read-out apparatus 40 such that it may extend parallel to the direction, along which the cassette 10 is loaded to the radiation image read-out apparatus 40. When the cassette 10 is loaded to the radiation image read-out apparatus 40 in the manner described above, the lock releasing pin 41 passes through a pin passage hole 12b, which is formed in the box member 12 as shown in FIG. 1, and enters the box member 12. The lock releasing pin 41 pushes the slider 14 towards the inner part of the cassette 10 (i.e., in the direction indicated by the arrow C in FIG. 1) against the urging force of the spring 18. As a result, as shown in FIG. 3B, the locking claw 16 of the slider 14 moves away from the locking claw 30 of the cover member 13, and the lock of the cover member 13 is thereby released.

Figure 3C:
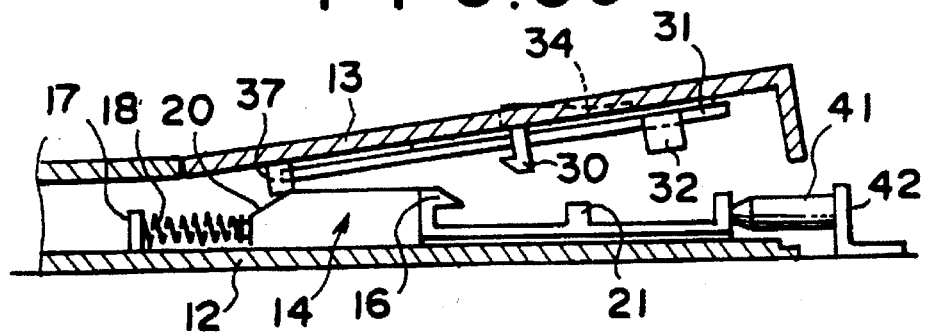
Figure 3D:
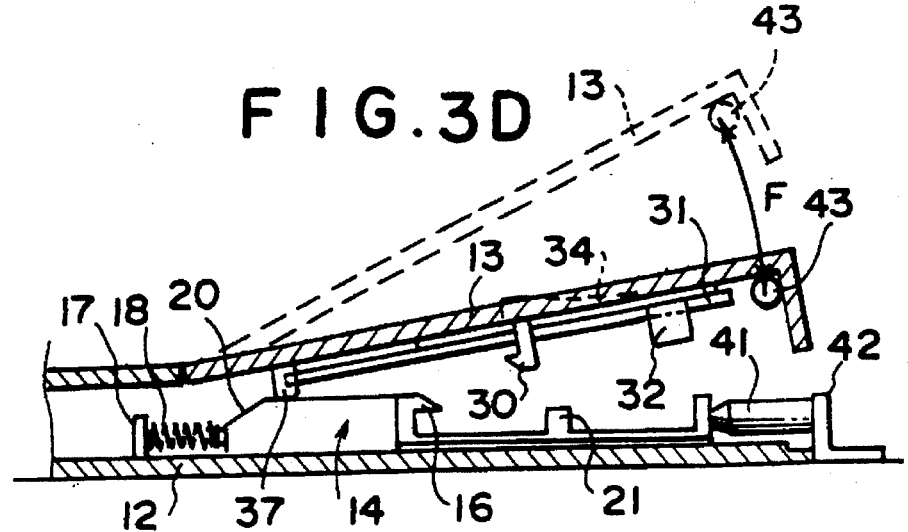

As illustrated in FIG. 3C, when the cassette 10 is further pushed into the radiation image read-out apparatus 40, the slider 14 further moves, and the slant surface of the pushing member 20 pushes the pushed protrusion 37 of the cover member 13. As a result, the pushed protrusion 37 is pushed up by the cam effects, and the cover member 13 swings around the swing axis A so as to open the opening 12a. As illustrated in FIG. 3D, when the cassette 10 has been pushed to the predetermined loading position, the front end of the cassette 10 comes into contact with a stopper 42, and the cassette 10 is kept at the current position.

When the cassette 10 has been loaded to the predetermined in the radiation image read-out apparatus 40, the operation for releasing the lock of the cover member 13 and the operation for opening the cover member 13 are effected automatically in the manner described above. In the manner described above, the lock releasing and the cover opening may be carried out by utilizing the force for loading the cassette 10 to the radiation image read-out apparatus 40. Alternatively, the lock releasing pin 41 may be moved by a driving means after the cassette 10 has been loaded to the predetermined position. However, in cases where the lock releasing and the cover opening are carried out by utilizing the cassette loading force as in the aforesaid embodiment, no driving means is required for the lock releasing pin 41, and the lock releasing and the cover opening can be completed at the time at which the cassette loading operation is finished. Therefore, the mechanism of the radiation image read-out apparatus 40 can be kept simple, and the operations thereof can be carried out quickly.

With the aforesaid embodiment of the cassette 10, the cover member 13 is opened only slightly during the automatic cover opening carried out in the manner described above. In such cases, a large cassette loading force is not required for the cover opening operation. However, in such cases, for the purposes of taking the stimulable phosphor sheet 11 out of the cassette 10, it is necessary to further open the cover member 13 largely.

Therefore, in this embodiment, as illustrated in FIG. 3D, the radiation image read-out apparatus 40 is provided with a cover opening member 43, which moves transversely with respect to the cassette 10 (i.e., in the direction normal to the plane of the sheet of FIG. 3D) and which moves in the direction indicated by the arrow F. The cover opening member 43 moves transversely to a position inward from the cover member 13, which has been opened slightly, and then moves to the position indicated by the broken line in FIG. 3D. In this manner, the cover member 13 is opened largely to the position indicated by the broken line in FIG. 3D.

In this embodiment, the cover opening member 43 is used in order to open the cover member 13 largely. Alternatively, for example, a mechanism for moving an air suction cup, which can adhere to the upper surface of the cover member 13, in the direction indicated by the arrow F may be used for this purpose. For a cassette wherein only the release of the cover lock is carried out automatically when the cassette is loaded to the radiation image read-out apparatus 40, a cover opening mechanism using such an air suction cup should be used in order to open the cover member largely. On the other hand, with the cassette 10 in accordance with the present invention wherein the cover member 13 is automatically opened even slightly during the cassette loading, one of various types of cover opening mechanisms can be used in order to open the cover member 13 largely. Therefore, a suitable cover opening mechanism can be selected from a wide variety of mechanisms.

As illustrated in FIG. 4, when the cover member 13 has been opened largely in the manner described above, a sheet conveying mechanism 45 provided with a driving roller 44 moves in the direction indicated by the arrow G, enters the region between the box member 12 and the cover member 13, and brings the driving roller 44 into contact with the stimulable phosphor sheet 11. Thereafter, the driving roller 44 is rotated counter-clockwise in FIG. 4 by a driving means (not shown). The stimulable phosphor sheet 11 is thereby conveyed out of the cassette 10.

The stimulable phosphor sheet 11, which has thus been conveyed out of the cassette 10, is conveyed into a read-out section 62 via an erasing section 60 by a sheet conveying system, which is constituted of guide plates 46, 47, 48 and nip rollers 49, 50, 51, 52, 53, 54, 55, 56, 57, and the like. In the read-out section 62, the radiation image stored on the stimulable phosphor sheet 11 is read out with a method disclosed in, for example, U.S. Pat. No. 4,258,264. How such a read-out operation is carried out will be briefly described hereinbelow. The stimulable phosphor sheet 11 is conveyed by the nip rollers 55, 56, and 57 at a predetermined speed in the sub-scanning direction indicated by the arrow H in FIG. 4. A laser beam 64 serving as stimulating rays is radiated from a main scanning optical system 63. The laser beam 64 scans the stimulable phosphor sheet 11 in the main scanning direction, which is approximately normal to the sub-scanning direction indicated by the arrow H.

When the stimulable phosphor sheet 11 is exposed to the laser beam 64, the exposed portion of the stimulable phosphor sheet 11 emits light in an amount proportional to the amount of energy stored thereon during its exposure to the radiation. The emitted light is guided by a light guide member 65 and detected by a photodetector 66, which may be constituted of a photomultiplier, or the like. The photodetector 66 generates an output signal S representing the radiation image stored on the stimulable phosphor sheet 11. The signal S is then fed into an image reproducing apparatus, such as a CRT display device or a light beam scanning recording apparatus, and used during the reproduction of the radiation image. In this manner, the radiation image, which was stored on the stimulable phosphor sheet 11, is reproduced as a visible image.

After the radiation image has been read out from the stimulable phosphor sheet 11, the nip rollers 49 through 57 are rotated reversely, and the stimulable phosphor sheet 11 is conveyed from the read-out section 62 to the erasing section 60 provided with a plurality of erasing light sources 61, 61, . . . When the stimulable phosphor sheet 11 passes through the erasing section 60, the erasing light sources 61, 61, . . . are turned on in order to produce erasing light, and the stimulable phosphor sheet 11 is exposed to the erasing light. In this manner, energy remaining on the stimulable phosphor sheet 11 after the radiation image has been read out therefrom is released from the stimulable phosphor sheet 11, and the stimulable phosphor sheet 11 can then be reused for the recording of a radiation image.

The erased stimulable phosphor sheet 11 is conveyed by the driving roller 44, which now rotates reversely, i.e. clockwise, into the cassette 10. Thereafter, operations reverse to the operations for taking the stimulable phosphor sheet 11 out are carried out, and the cover closing and locking are thereby carried out on the cassette 10. Specifically, the sheet conveying mechanism 45 moves in the direction opposite to that indicated by the arrow G, retracts from the region between the box member 12 and the cover member 13 to the exterior, and returns to the original position. Thereafter, the cover opening member 43 shown in FIG. 3D returns from the position indicated by the broken line to the position indicated by the solid line and retracts transversely (i.e., in the direction heading to the rear of the plane of the sheet of FIG. 3D) away from the side inward from the cover member 13.

By way of example, an indicator indicates that the cover opening member 43 has retracted from the cassette 10. An operator of the apparatus then pulls the cassette 10 out of the cassette receiving port 40a. Thereafter, the states of the slider 14 and the cover member 13 change in the order of FIGS. 3D, 3C, 3B, and 3A, and the closing and locking of the cover member 13 are thereby carried out.

Figure 5:
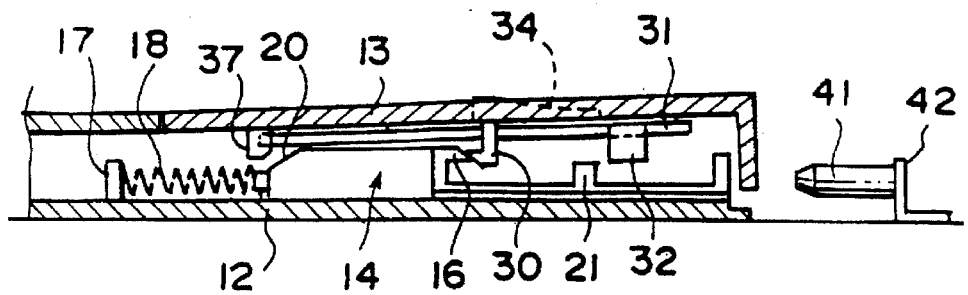
FIG. 5 is a sectional side view showing the state of the major part of the cassette of FIG. 1 when the cover member of the cassette is closed.

At this time, it will often occur that the cover member 13 does not return to the completely closed position before the slider 14 returns to the locking position shown in FIG. 3A. In such cases, as illustrated in FIG. 5, the locking claw 30 of the cover member 13 is stuck on the locking claw 16 of the slider 14, and they do not engage with each other. Accordingly, the radiation image read-out apparatus 40 is provided with a pair of cover closing rollers 68, 68 which come into elastic contact with the cassette 10 from above. These cover closing rollers 68, 68 are located such that, when the cassette 10 is pulled out of the cassette receiving port 40a, each of them may push a portion of the upper surface (i.e., the portion indicated by a circle J drawn with the broken line in FIG. 1) approximately corresponding to the back side of the position of the locking claw 30 of the cover member 13.

When the cover member 13 is pushed down by the cover closing rollers 68, 68, the locking claw 30 is caused to push the locking claw 16 down. At this time, the locking claw 16 is caused to move in the direction indicated by the arrow C by the effects of the tapered surfaces of the locking claws 30 and 16. At the time at which the cover member 13 is closed completely, the locking claw 16 is returned to the locking position by the force of the spring 18 and engaged with the locking claw 30. In this manner, when the cassette 10 is completely pulled out of the cassette receiving port 40a of the radiation image read-out apparatus 40, the locking claws 30 and 16 are reliably engaged with each other, and the cover member 13 is thereby locked.

As described above, the cover member 13 of the cassette 10 is opened when the cassette 10 is loaded into the radiation image read-out apparatus 40. The cover member 13 is also opened manually when, for example, the stimulable phosphor sheet 11 housed in the cassette 10 is to be exchanged or inspected. How the cover member 13 is opened manually will be described hereinbelow. When the cover member 13 is closed, the operating means 34, 34 of a pair of the manual operating pieces 31, 31 mounted on the cover member 13 are pushed by fingers of the operator in the direction indicated by the arrow D in FIG. 1. As a result, the protrusion 32 of each of the manual operating pieces 31, 31 pushes the corresponding protrusion 21 and thereby moves the slider 14 in the direction indicated by the arrow D. The slider 14 is thus set in the state shown in FIG. 3B, and the lock of the cover member 13 is released.

When the manual operating piece 31 is pushed and the lock is released in the manner described above, the latching piece 33 secured to the manual operating piece 31 deforms elastically, passes over the latching means 22, and is engaged with the latching means 22. Therefore, the slider 14 and the manual operating piece 31 respectively urged by the springs 18 and 36 do not return to the locking position when the operator releases his fingers from the operating means 34 of the manual operating piece 31. In this manner, the operator can release his fingers from the operating means 34 and can manually open the cover member 13.

When the cover member 13 is manually opened in the manner described above, the latching piece 33 disengages from the latching means 22, and therefore the slider 14 and the manual operating piece 31 are returned to the locking position respectively by the urging force of the springs 18 and 36. After the exchange of the stimulable phosphor sheet 11, or the like, is finished, the portion in the circle J indicated by the broken line in FIG. 1 is pushed by a finger of the operator, and the cover member 13 is thereby closed. As a result, in the same manner as that when the cover member 13 is pushed by the cover closing rollers 68, 68, the locking claw 30 engages with the locking claw 16, and the cover member 13 is locked in the closed state.

Even if the manual lock releasing mechanism described above is not provided, the cover member 13 can be opened manually by inserting a pin-like material into the pin passage hole 12b of the box member 12. However, the manual lock releasing mechanism should preferably be provided in order to facilitate the manual lock releasing operation.

In the aforesaid embodiment, the pushing member 20 has the slant surface. Alternatively, the pushing member 20 may not be provided with the slant surface, and the pushed protrusion 37 of the cover member 13 may be provided with such a slant surface. The cassette in accordance with the present invention, the embodiment of which is described above, is also applicable when a sheet-shaped image recording medium other than the stimulable phosphor sheet is housed in the cassette.

Embodiments of the device for conveying an image recording medium out of a cassette in accordance with the present invention will be described hereinbelow. By way of example, in these embodiments, the stimulable phosphor sheet 11 is conveyed out of the first embodiment of the cassette in accordance with the present invention, which is shown in FIG. 1.

Figure 6:
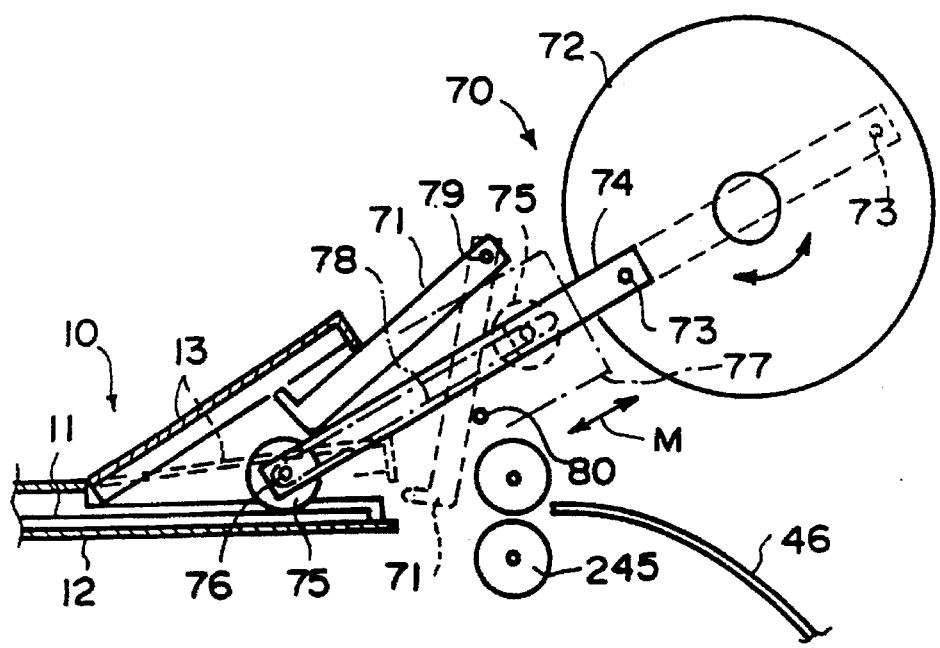
FIG. 6 is a side view showing a first embodiment of the device for conveying an image recording medium out of a cassette in accordance with the present invention.
Figure 7:
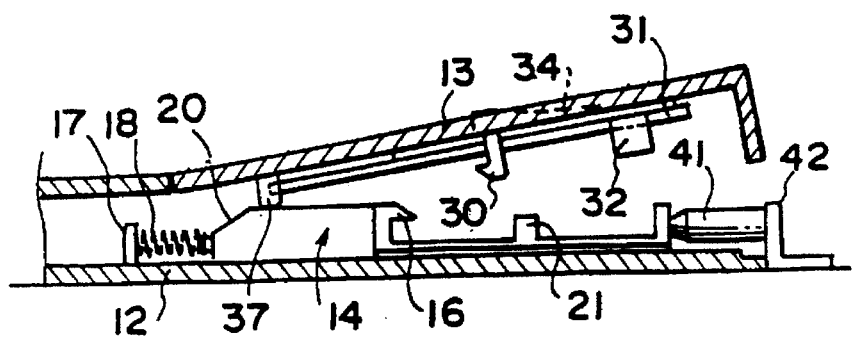
FIG. 7 is a sectional side view showing the state of the cassette of FIG. 1 when the cover member of the cassette is opened.

FIG. 6 shows a first embodiment of the device for conveying an image recording medium out of a cassette in accordance with the present invention. In FIG. 6, similar elements are numbered with the same reference numerals with respect to FIG. 1. In this case, the cover opening member 43 shown in FIG. 3D is not provided.

Figure 8:
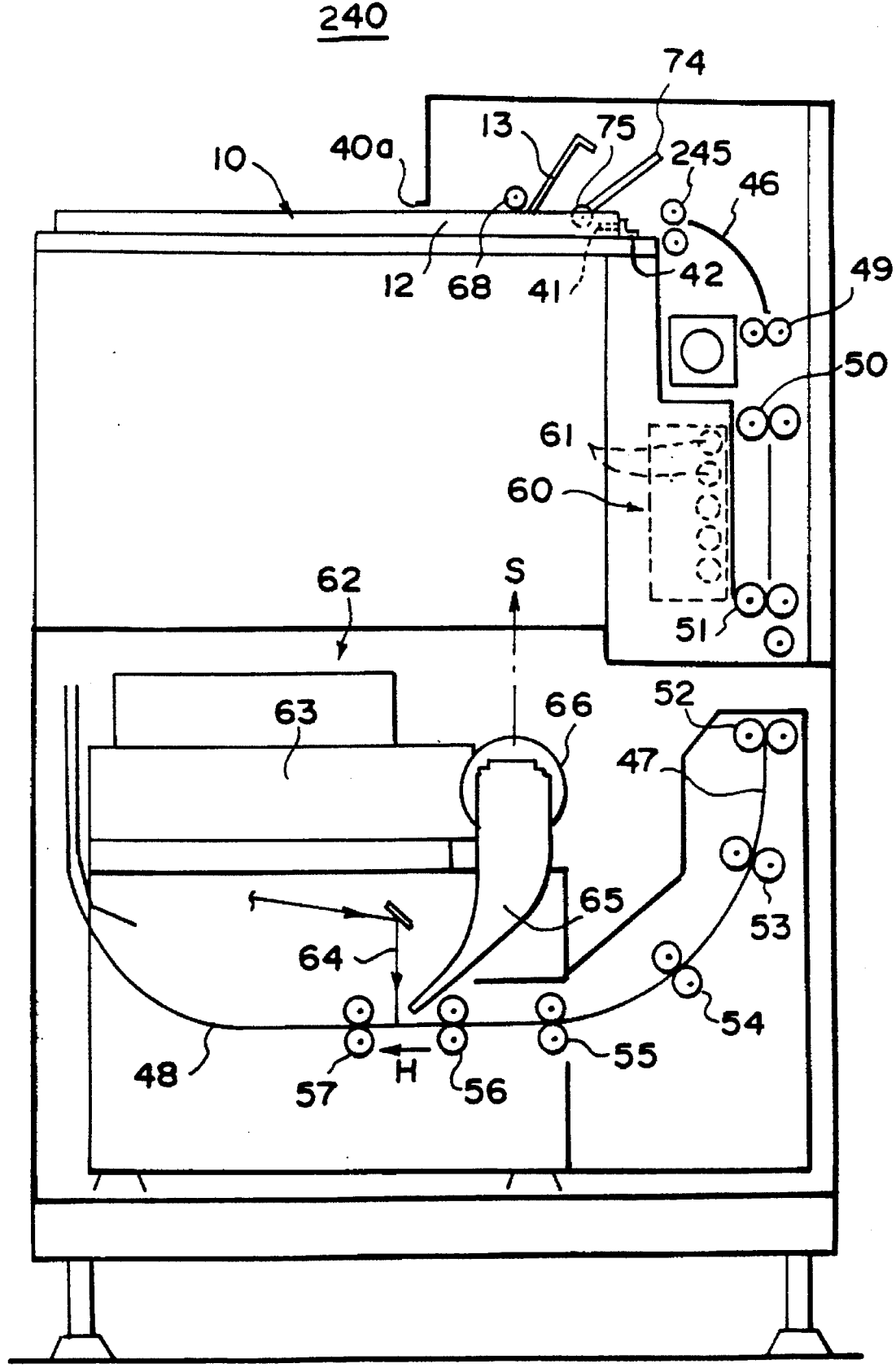
FIG. 8 is a schematic side view showing a radiation image read-out apparatus to which the cassette of FIG. 1 is loaded.

A radiation image is stored on the stimulable phosphor sheet 11 having been housed in the cassette 10, and the cassette 10 is then loaded to a radiation image read-out apparatus 240 shown in FIG. 8. The radiation image read-out apparatus 240 is constituted in the same manner as that in the radiation image read-out apparatus 40 shown in FIG. 4, except for the section at which the stimulable phosphor sheet 11 is conveyed out of and into the cassette 10. In FIG. 8, similar elements are numbered with the same reference numerals with respect to FIG. 4. When the cassette 10 is loaded into the radiation image read-out apparatus 240, the lock releasing and the cover opening are carried out in the order of FIGS. 3A, 3B, and 3C and FIG. 7 (corresponding to FIG. 3D).

When the cassette 10 is loaded to the predetermined position in the radiation image read-out apparatus 240, the lock releasing and slight cover opening are carried out automatically. In this state, the stimulable phosphor sheet 11 is conveyed out of the cassette 10 by the device shown in FIG. 6. The device for conveying the stimulable phosphor sheet out of the cassette will be described hereinbelow.

As illustrated in FIG. 6, this device comprises a sheet take-out mechanism 70 and a cover opening arm 71, which serves as a cover opening mechanism. The sheet take-out mechanism 70 comprises a pair of disks 72, 72, which are spaced from each other and are rotated 180° clockwise and counter-clockwise by a driving means (not shown), a pair of roller arms 74, 74, which are respectively mounted by pins 73, 73 on the disks 72, 72 such that the roller arms 74, 74 can swing, and an elongated cylindrical rubber rollers 75, which is supported between the leading ends of the roller arms 74, 74. The roller 75 is supported such that it can rotate around a rotation shaft 76 and is rotated clockwise and counter-clockwise by a drive means (not shown). Also, the two ends of the rotation shaft 76 are extended transversely outwardly (i.e., towards the rear and the front of the plane of the sheet of FIG. 6) and loosely fitted-into guide grooves 78, 78 of guide plates 77, 77, which are secured to the main body of the device.

Therefore, when each of the disk 72 rotates, the corresponding roller arm 74 swings, and the roller 75 moves linearly in the direction indicated by the arrow M along the guide groove 78. The disk 72 stops at the time at which the pin 73 mounted thereon is brought to the position indicated by the solid line and the position indicated by the broken line. When the pin 73 is brought to the position indicated by the solid line, the leading end of the roller arm 74, i.e., the roller 75, reaches the left lowest position in FIG. 6 (i.e., the take-out position). When the pin 73 is brought to the position indicated by the broken line, the roller 75 reaches the right highest position in FIG. 6 (i.e., the waiting position).

The cover opening arm 71 has a hook-like lower end. The upper end of the cover opening arm 71 is supported such that the cover opening arm 71 can swing around a swing shaft 79. When receiving no external force, the cover opening arm 71 is suspended in an approximately vertical orientation by gravity. The cover opening arm 71 is thus received by a stopper 80 and located at the position indicated by the broken line. Only a single such cover opening arm 71 may be provided. In cases where the size of the cassette 10 is large, a plurality of such cover opening arms 71, 71, . . . may be located in spaced relation to one another with respect to the width direction of the cassette 10 (i.e., the length direction of the roller 75).

The device shown in FIG. 6 operates in the manner described below. Before the cassette 10 is loaded into the radiation image read-out apparatus 240, the roller 75 is located at the waiting position. When the cassette 10 is loaded (and the lock releasing and slight cover opening are effected in the manner described above), a photoelectric detection means, or the like, detects the loading state and generates a signal. In accordance with the signal, each of the disks 72, 72 is rotated 180° clockwise in FIG. 6. As a result, the roller 75 moves linearly from the waiting position to the take-out position. During the linear movement, the roller 75 pushes up the cover opening arm 71, which is present at the position indicated by the broken line. Therefore, the cover opening arm 71 swings around the swing shaft 79. At the time at which the roller 75 reaches the take-out position, the cover opening arm 71 is brought to the position indicated by the solid line in FIG. 6. Midway during the swinging of the cover opening arm 71, the hook-like lower end thereof catches the cover member 13, which was opened only slightly to the position indicated by the broken line. The hook-like lower end of the cover opening arm 71 thus opens the cover member 13 largely to the position indicated by the solid line.

Accordingly, the roller 75 can now enter the cassette 10. When the roller 75 is brought to the take-out position, it comes into elastic contact with the stimulable phosphor sheet 11 housed in the cassette 10. When this state is detected by, for example, a photoelectric detection means (not shown), the roller 75 is rotated counter-clockwise in FIG. 6. In this manner, the stimulable phosphor sheet 11 in contact with the roller 75 is passed through the opening 12a and conveyed out of the cassette 10.

The stimulable phosphor sheet 11, which has thus been conveyed out of the cassette 10, is conveyed into the read-out section 62 via the erasing section 60 by a sheet conveying system, which is constituted of the guide plates 46, 47, 48 and nip rollers 245, 49, 50, 51, 52, 53, 54, 55, 56, 57, and the like.

After the radiation image has been read out from the stimulable phosphor sheet 11, the nip rollers 49 through 57 are rotated reversely, and the stimulable phosphor sheet 11 is conveyed from the read-out section 62 to the erasing section 60 and then to the cassette loading section.

The erased stimulable phosphor sheet 11 is conveyed by the roller 75, which now rotates reversely, i.e. clockwise, into the cassette 10. Thereafter, operations reverse to the operations for taking the stimulable phosphor sheet 11 out are carried out, and the cover closing and locking are thereby carried out on the cassette 10. Specifically, each of the disks 72, 72 is rotated 180° counter-clockwise in FIG. 6. The roller 75 thus returns from the take-out position to the waiting position, and the cover opening arm 71, which has been pushed up by the roller 75, returns by gravity to the position indicated by the broken line in FIG. 6. Therefore, the cover member 13, which has been opened largely by the cover opening arm 71, returns to the original, slightly open state (i.e., the state indicated by the broken line in FIG. 6). The state, in which the roller 75 has returned to the waiting position, is detected by the detection means and indicated on, for example, the indicator. The operator of the apparatus then pulls the cassette 10 out of the cassette receiving port 40a. As a result, in this case, the states of the slider 14 and the cover member 13 change in the order of FIGS. 7, 3C, 3B, and 3A, and the closing and locking of the cover member 13 are thereby carried out.

As described above, with the aforesaid embodiment of the device for conveying an image recording medium out of a cassette in accordance with the present invention, when the cover member 13 opens largely, the roller 75 has already been brought into contact with the stimulable phosphor sheet 11. Therefore, the takeout of the stimulable phosphor sheet 11 can be carried out more quickly than with a device, wherein the sheet take-out mechanism moves into the cassette 10 after the cover member 13 has been opened largely. Also, the cover opening arm 71 opens the cover member 13 largely by being pushed by the roller 75, which is moving. Therefore, no particular driving source is required to operate the cover opening arm 71. Accordingly, the size of the device in accordance with the present invention can be kept smaller and the cost thereof can be kept lower than a device, wherein a driving source for operating the cover opening arm is provided independently of the driving source for rotating the disk 72.

Figure 9:
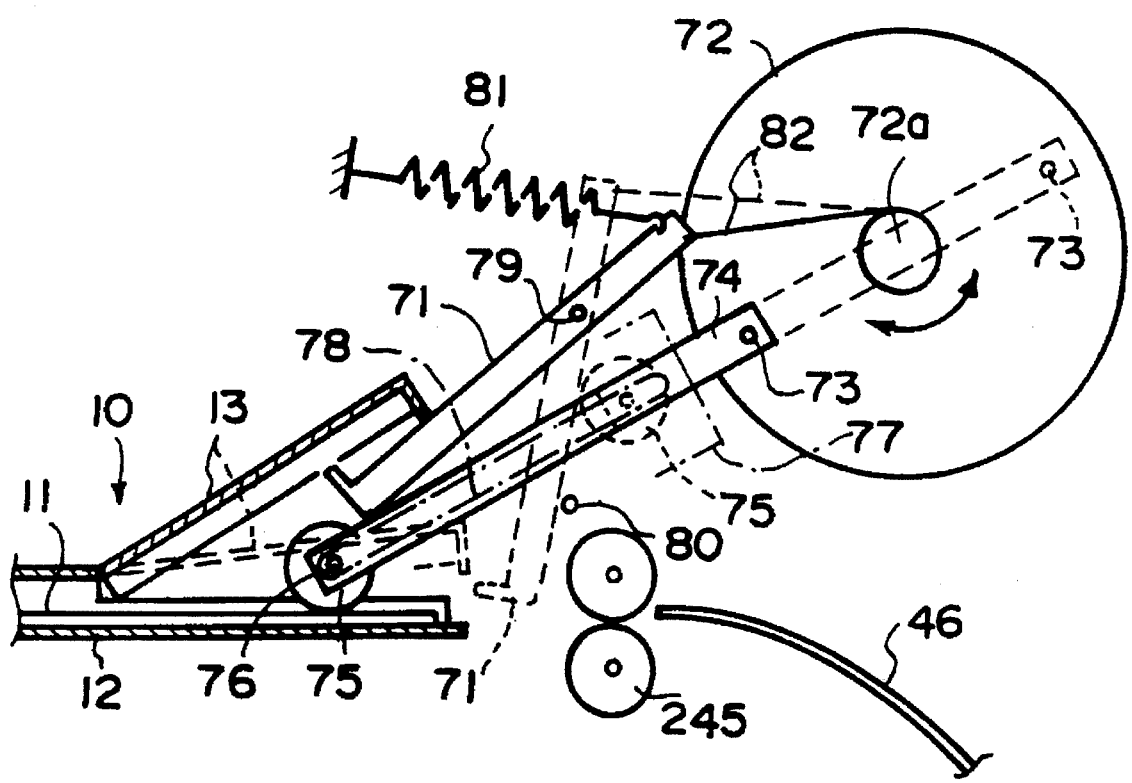
FIG. 9 is a side view showing a second embodiment of the device for conveying an image recording medium out of a cassette in accordance with the present invention.

A second embodiment of the device for conveying an image recording medium out of a cassette in accordance with the present invention will be described hereinbelow with reference to FIG. 9. In FIG. 9, similar elements are numbered with the same reference numerals with respect to FIG. 6. (This also applies to FIGS. 10 and 11.) In the second embodiment of the device, the upper part of the cover opening arm 71 is extended from the position of the swing shaft 79, and one end of a reset spring 81 is engaged with the upper end of the cover opening arm 71. The reset spring 81 is constituted of a tension spring, and the other end of the reset spring 81 is engaged with the main body of the device. Therefore, the cover opening arm 71 is urged counter-clockwise around the swing shaft 79 such that the cover opening arm 71 may be brought into contact with the stopper 80. Also, one end of a wire 82 is engaged with the upper end of the cover opening arm 71, and the other end of the wire 82 is secured to the rotation shaft 72a of the disk 72.

In the second embodiment of the device, the sheet take-out mechanism is constituted of the elements 72 through 80, and the cover opening mechanism is constituted of the cover opening arm 71, the reset spring 81, and the wire 82.

When the rotation shaft 72a rotates clockwise to move the roller 75 from the waiting position indicated by the broken line to the take-out position indicated by the solid line, the wire 82 is wound up around the rotation shaft 72a. Therefore, the cover opening arm 71, which has been brought to the position, which is indicated by the broken line and which is in contact with the stopper 80, swings clockwise around the swing shaft 79 against the urging force of the reset spring 81. The cover opening arm 71 swinging in this manner opens the cover member 13 largely while the roller 75 is moving towards the take-out position, that is in contact with the stimulable phosphor sheet 11. In this embodiment, in the manner described above, when the cover member 13 is open largely, the roller 75 has already been brought into contact with the stimulable phosphor sheet 11.

After the radiation image read-out operation and the erasing operation are carried out on the stimulable phosphor sheet 11, the stimulable phosphor sheet 11 is returned into the cassette 10, and the cover member 13 is closed. At this time, the rotation shaft 72a of the disk 72 rotates reversely, i.e. counter-clockwise. Therefore, the roller 75 moves from the take-out position to the waiting position. Also, the wire 82 is unwound from the rotation shaft 72a, and the cover opening arm 71 is returned to the position indicated by the broken line by the effects of the reset spring 81.

Figure 10:
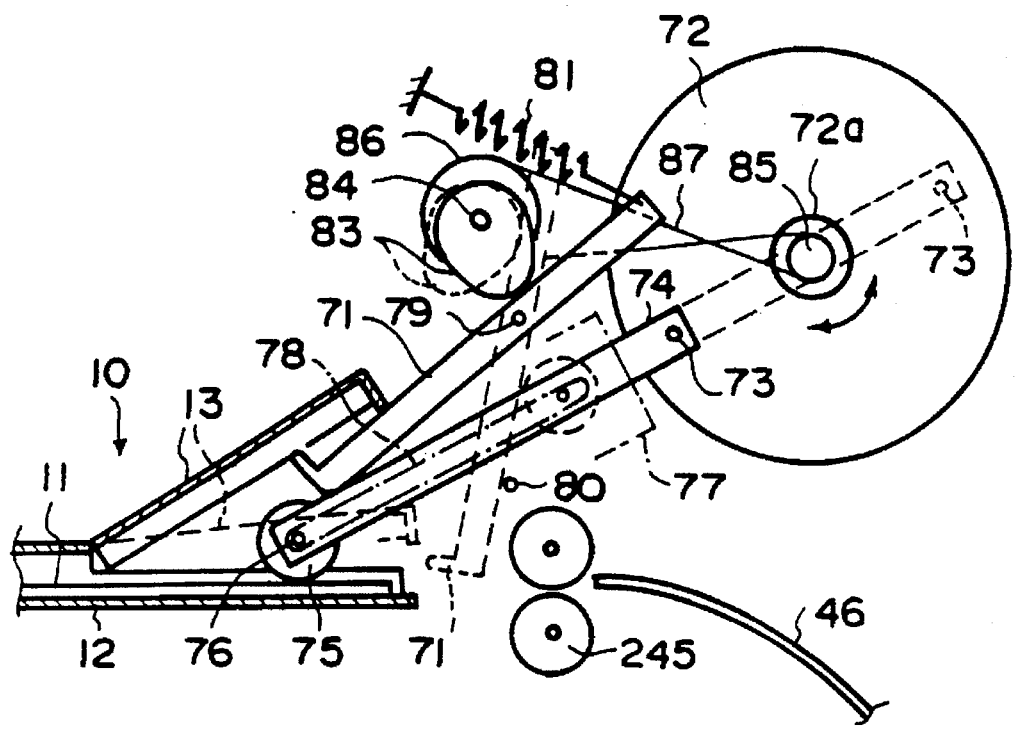
FIG. 10 is a side view showing a third embodiment of the device for conveying an image recording medium out of a cassette in accordance with the present invention.

A third embodiment of the device for conveying an image recording medium out of a cassette in accordance with the present invention will be described hereinbelow with reference to FIG. 10. In this embodiment, in the same manner as that in the second embodiment of the device, the cover opening arm 71 is urged by the reset spring 81. Also, a cam 83 is located such that it may be in contact with the portion of the cover opening arm 71 above the swing shaft 79. The cam 83 rotates around a shaft 84. The shaft 84 and the rotation shaft 72a of the disk 72 are coupled with each other by belt wheels 85, 86 and a belt 87, which is threaded over the belt wheels 85, 86.

In the third embodiment of the device, the sheet take-out mechanism is constituted of the elements 72 through 80, and the cover opening mechanism is constituted of the cover opening arm 71, the reset spring 81, and the elements 83 through 87.

In this embodiment, when the roller 75 is located at the waiting position indicated by the broken line, the cam 83 is located at the position indicated by the broken line. When the roller 75 moves towards the take-out position indicated by the solid line, the cam 83 rotates counter-clockwise around the shaft 84. At the time at which the roller 75 is brought to the take-out position, the cam comes to the position indicated by the solid line. The cover opening arm 71, which is originally located at the position indicated by the broken line, is pushed by the thus rotating cam 83 and swung clockwise around the swing shaft 79. The cover opening arm 71 swinging in this manner opens the cover member 13 largely while the roller 75 is moving towards the take-out position, that is in contact with the stimulable phosphor sheet 11. In this embodiment, in the manner described above, when the cover member 13 is open largely, the roller 75 has already been brought into contact with the stimulable phosphor sheet 11.

After the radiation image read-out operation and the erasing operation are carried out on the stimulable phosphor sheet 11, the stimulable phosphor sheet 11 is returned into the cassette 10, and the cover member 13 is closed. At this time, the rotation shaft 72a of the disk 72 rotates reversely, i.e. counter-clockwise. Therefore, the roller 75 moves from the take-out position to the waiting position. Also, the cam 83 rotates reversely, i.e. clockwise, and the cover opening arm 71 is returned to the position indicated by the broken line by the effects of the reset spring 81. The means for rotating the cam 83 by utilizing the rotation of the disk 72 is not limited to the power transmission means composed of the belt wheels 85, 86 and the belt 87, and may be a gear type of power transmission means, or the like.

Figure 11:
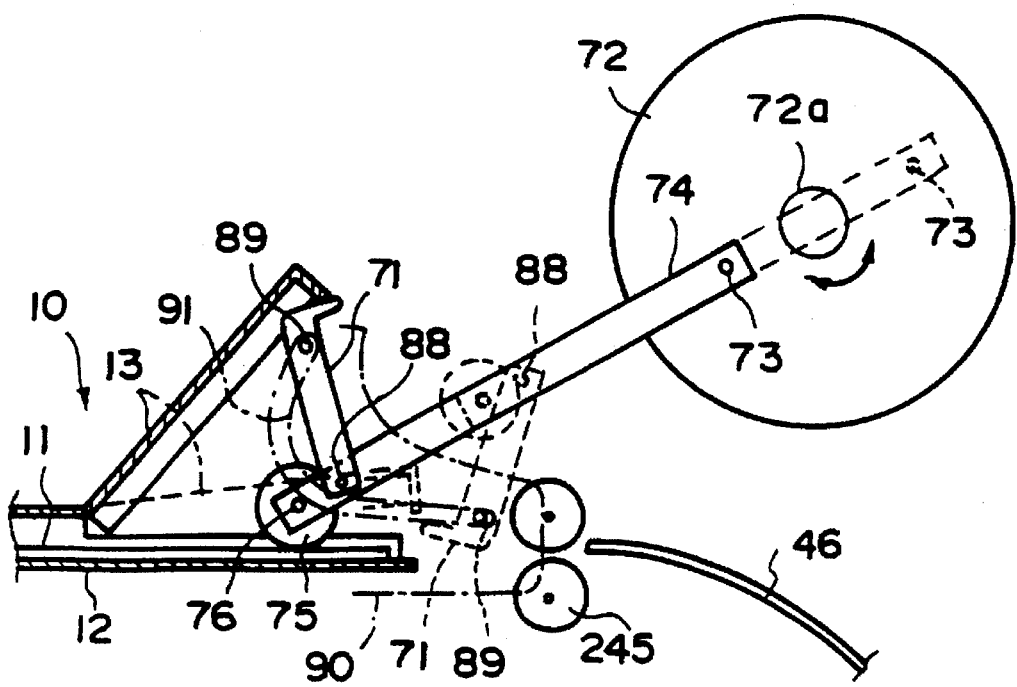
FIG. 11 is a side view showing a fourth embodiment of the device for conveying an image recording medium out of a cassette in accordance with the present invention.

A fourth embodiment of the device for conveying an image recording medium out of a cassette in accordance with the present invention will be described hereinbelow with reference to FIG. 11. In this embodiment, the base end of the cover opening arm 71 is coupled by a turning shaft 88 with the roller arm 74 such that the cover opening arm 71 can turn around the turning shaft 88. Also, a guide pin 89 projects from the leading end of the cover opening arm 71. The guide pin 89 is loosely fitted into a guide groove 91, which is formed in a guide plate 90.

In this embodiment, when the roller 75 is located at the waiting position indicated by the broken line, the cover opening arm 71 is located at the position indicated by the broken line. When the roller 75 moves towards the take-out position indicated by the solid line, the guide pin 89 secured to the leading end of the cover opening arm 71 is guided by the guide groove 91, and the cover opening arm 71 turns clockwise around the turning shaft 88. The cover member 13 is opened largely by the cover opening arm 71, which is thus turning. In this embodiment, in the manner described above, when the cover member 13 is open largely, the roller 75 has already been brought into contact with the stimulable phosphor sheet 11.

After the radiation image read-out operation and the erasing operation are carried out on the stimulable phosphor sheet 11, the stimulable phosphor sheet 11 is returned into the cassette 10, and the cover member 13 is closed. At this time, the rotation shaft 72a of the disk 72 rotates reversely, i.e. counter-clockwise. Therefore, the roller 75 moves from the take-out position to the waiting position. Also, the cover opening arm 71 turns reversely, i.e. counter-clockwise, and returns to the position indicated by the broken line.

In the aforesaid embodiments of the device for conveying an image recording medium out of a cassette in accordance with the present invention, the sheet take-out mechanism is employed wherein the roller 75 is rotated in order to take out the stimulable phosphor sheet 11. Alternatively, any of other sheet take-out mechanism may be employed. For example, a mechanism may be employed wherein an air suction cup adheres and holds the stimulable phosphor sheet 11 and is moved in order to take the stimulable phosphor sheet 11 out of the cassette 10. The device for conveying an image recording medium out of a cassette in accordance with the present invention is also applicable when a sheet-shaped image recording medium other than the stimulable phosphor sheet is conveyed out of a cassette.

Figure 12:
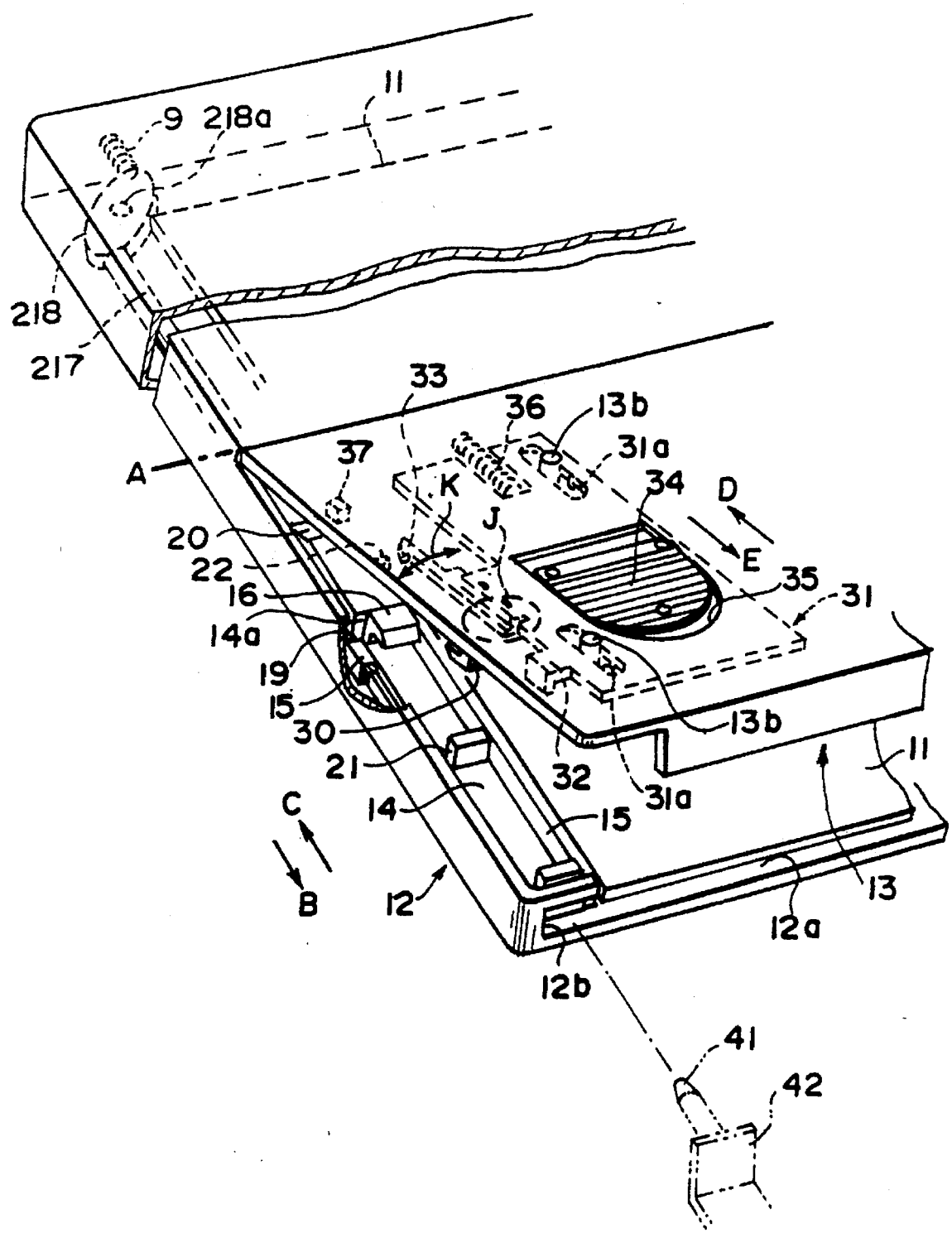
FIG. 12 is a perspective view showing the major part of a second embodiment of the cassette in accordance with the present invention.
Figure 13:
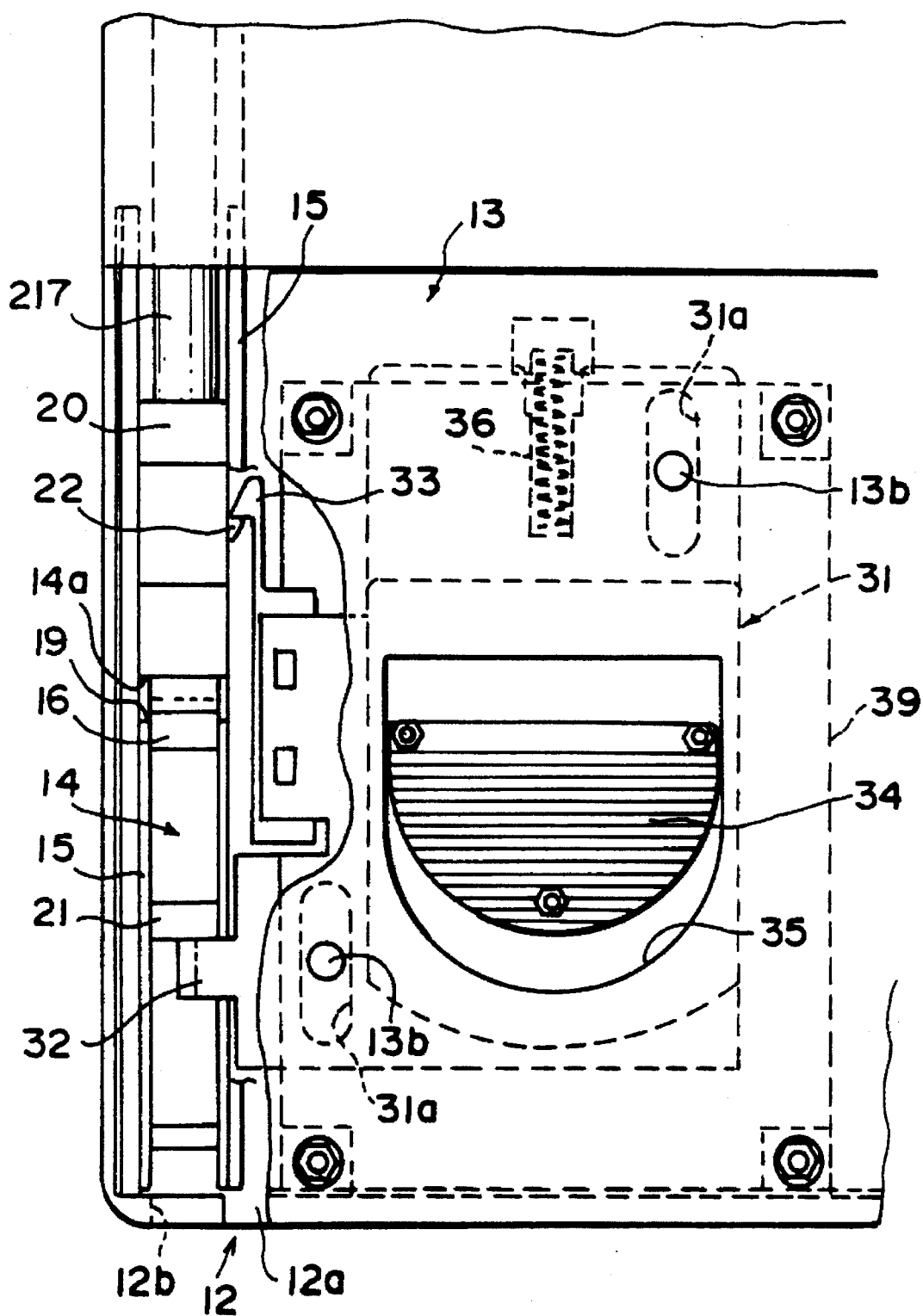
FIG. 13 is a partially cutaway plan view showing the major part of the cassette of FIG. 12, FIGS. 14A, 14B, 14C, and 14D are sectional side views showing how the major part of the cassette of FIG. 12 operates when a cover member of the cassette is opened.

A second embodiment of the cassette in accordance with the present invention will be described hereinbelow. FIG. 12 is a perspective view showing part of a cassette 210, which is a second embodiment of the cassette in accordance with the present invention. FIG. 13 is a partially cutaway plan view showing the part of the cassette shown in FIG. 12. In FIGS. 12 and 13, similar elements are numbered with the same reference numerals with respect to FIGS. 1 and 2.

FIG. 12 shows the state in which the cover member 13 opens the opening 12a (cover open state), and FIG. 13 shows the state in which the cover member 13 closes the opening 12a (cover closed state). In FIG. 13, the lock of the cover member 13 has been released by a manual operation, which will be described later. Though only the left end portion of the cassette 210 is shown in FIGS. 12 and 13, the same mechanism as that illustrated is also provided at the right end portion of the cassette 210.

Figure 17A:
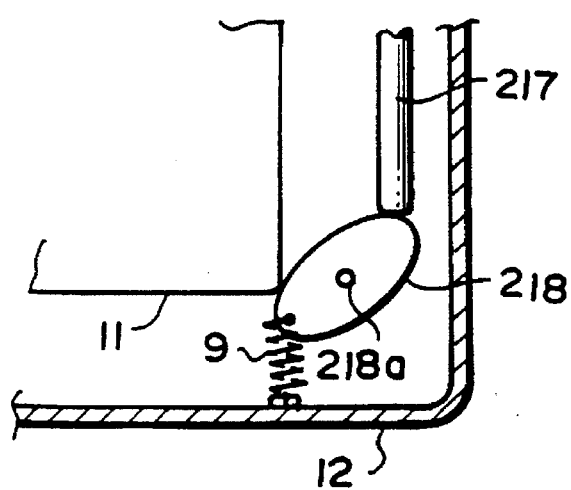
FIGS. 17A and 17B are partially cutaway plan views showing how a sheet discharging means of the cassette of FIG. 12 works when the cover member of the cassette is closed and when it is opened.
Figure 17B:
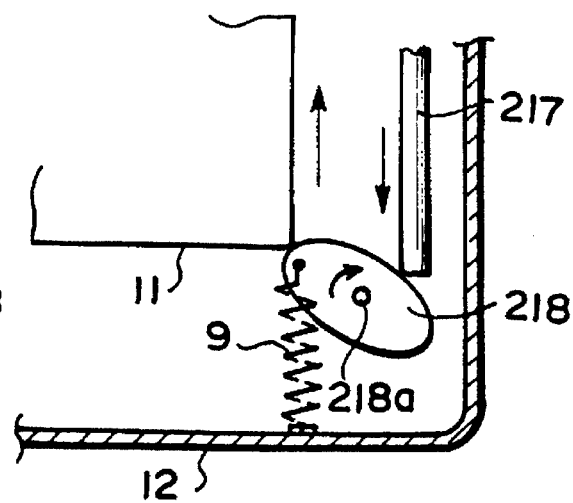

An elongated rod 217 is secured to the slider 14. The rod 217 extends in the direction, along which the slider 14 moves, up to the vicinity of the end of the box member 12 opposite to the opening 12a. Also, in the box member 12, an elliptic rotatable member 218 is supported such that it may be in contact with the leading end of the rod 217 and can rotate around a rotation shaft 218a, which extends in the thickness direction of the cassette 210. FIGS. 17A and 17B shows different states of the parts around the rotatable member 218. As illustrated in FIG. 17A, one end of a tension coiled spring 9 is secured to the box member 12, and the other end of the spring 9 is engaged with the rotatable member 218. The rotatable member 218 is pulled by the spring 9 and urged in the counter-clockwise rotating direction in FIG. 17A. Therefore, the slider 14 is urged towards the front end of the cassette 210 (i.e. in the direction indicated by the arrow B in FIG. 12). When receiving no other external force, the slider 14 thus urged is kept at a position (a locking position) at which an overhang 14a of the slider 14 comes into contact with a stopper 19 formed on the guide member 15. Also, the slider 14 is combined integrally with the pushing member 20 and the protrusion 21, which works during the manual lock releasing operation as will be described later. The upper part of the pushing member 20 is formed as a slant surface which becomes lower little by little towards the rod 217. The latching means 22 for keeping the manual lock releasing state is formed on the side inward from the slider 14 on the box member 12.

Figure 14A:
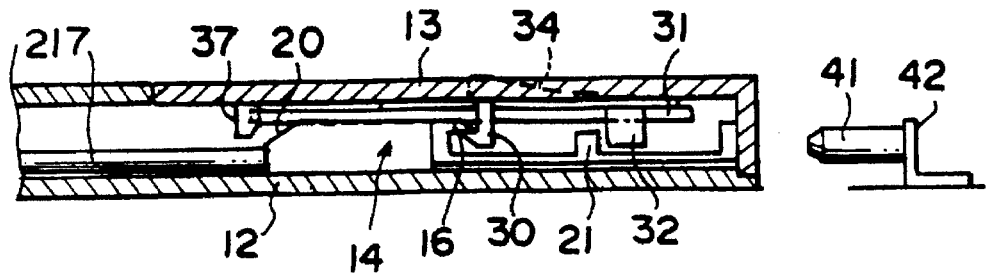

How the cassette 210 operates will be described hereinbelow with reference to FIGS. 14A, 14B, 14C, and 14D and FIG. 15. FIGS. 14A, 14B, 14C, and 14D are sectional side views showing how the parts of the cassette 210 located around the cover locking mechanism operate when the cover member 13 is opened. As illustrated in FIG. 14A, when the stimulable phosphor sheet 11 is housed in the box member 12 and the cover member 13 is closed, the locking claw 30 of the cover member 13 engages with the locking claw 16 of the slider 14, and the cover member 13 is thereby locked so as to keep the cover closed state.

Figure 15:
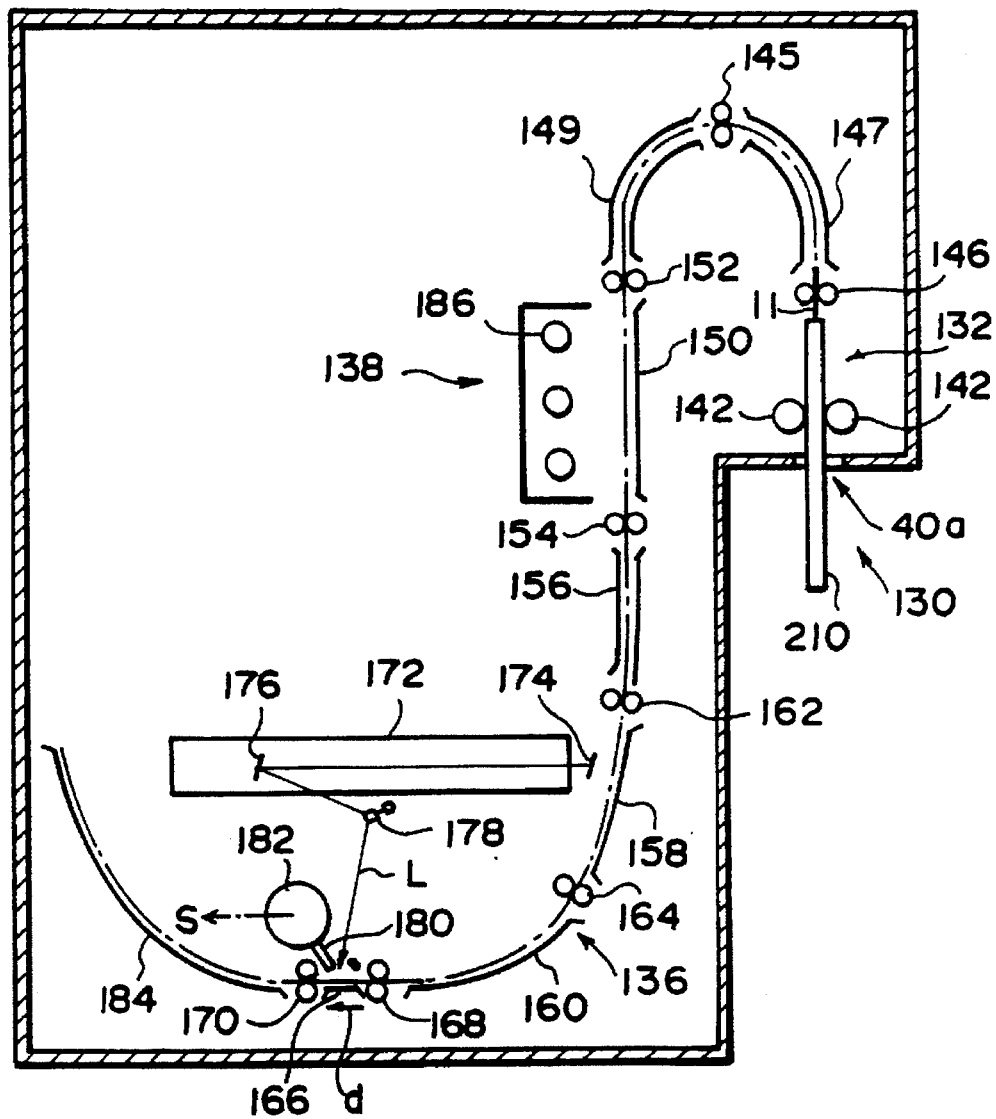
FIG. 15 is a schematic side view showing a radiation image read-out apparatus to which the cassette of FIG. 12 is loaded.

A radiation image is stored on the stimulable phosphor sheet 11 having been housed in the cassette 210, and the cassette 210 is then loaded to a radiation image read-out apparatus 340 shown in FIG. 15. At this time, the cassette 210 is inserted into the cassette receiving port 40a of the radiation image read-out apparatus 340 in an orientation such that the front end of the cassette 210 (i.e., its end having the opening 12a) may stand facing up. The cassette 210 is pushed in this orientation to a predetermined loading position 132. At this time, the cassette 210 passes between holding rollers 142, 142, which are constituted of a pair of nip rollers. Guide members (not shown) for guiding the two side ends of the cassette 210, which is being pushed in this manner, are provided in the radiation image read-out apparatus 340.

Figure 14B:
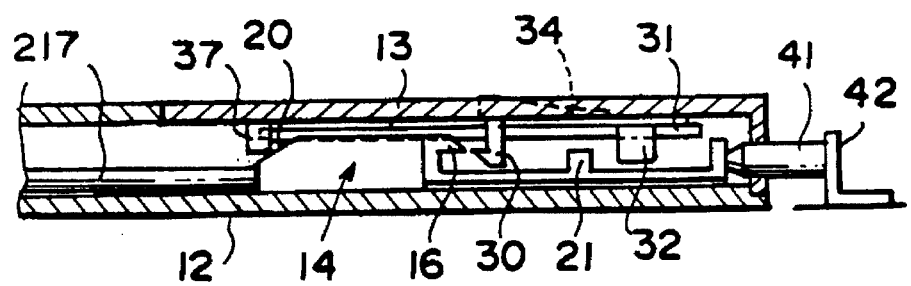

The lock releasing pin 41 is secured to the radiation image read-out apparatus 340 such that it may extend parallel to the direction, along which the cassette 210 is loaded to the radiation image read-out apparatus 340. When the cassette 210 is loaded to the radiation image read-out apparatus 340 in the manner described above, the lock releasing pin 41 passes through the pin passage hole 12b, which is formed in the box member 12 as shown in FIG. 12, and enters the box member 12. The lock releasing pin 41 pushes the slider 14 towards the inner part of the cassette 210 (i.e., in the direction indicated by the arrow C in FIG. 12) against the urging force of the spring 9. As a result, as shown in FIG. 14B, the locking claw 16 of the slider 14 moves away from the locking claw 30 of the cover member 13, and the lock of the cover member 13 is thereby released. In FIGS. 14A, 14B, 14C, and 14D, as an aid in facilitating the explanation, the cassette 210 is shown in the horizontal orientation. Actually, the right side in FIGS. 14A through 14D corresponds to the upper side in the radiation image read-out apparatus 340.

Figure 14C:
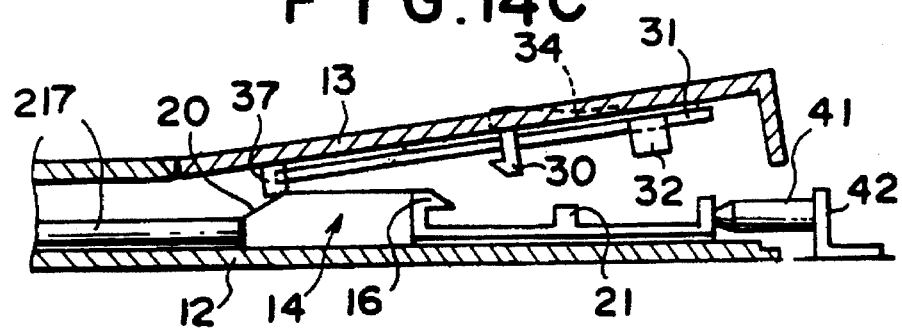
Figure 14D:
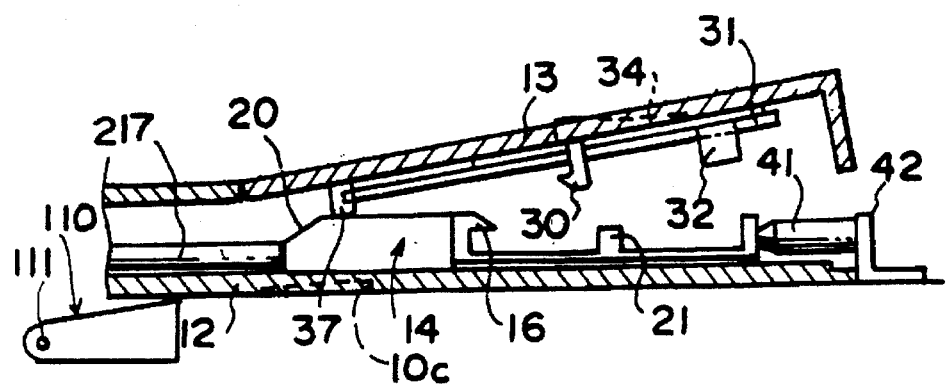

As illustrated in FIG. 14C, when the cassette 210 is further pushed into the radiation image read-out apparatus 340, the slider 14 further moves, and the slant surface of the pushing member 20 pushes the pushed protrusion 37 of the cover member 13. As a result, the pushed protrusion 37 is pushed up by the cam effects, and the cover member 13 swings around the swing axis A so as to open the opening 12a. As illustrated in FIG. 14D, when the cassette 210 has been pushed to the predetermined loading position, the front end of the cassette 210 comes into contact with a stopper 42, and the cassette 210 is kept at the current position.

When the slider 14 moves in the manner described above, the leading end of the rod 217 pushes the rotatable member 218, and therefore the rotatable member 218 rotates clockwise in FIG. 17A against the urging force of the spring 9. When the cover member 13 is closed, the rotatable member 218 is located at the position shown in FIG. 17A. When the front end of the cassette 210 is brought into contact with the stopper 42, the rotatable member 218 rotates to the position shown in FIG. 17B. When the rotatable member 218 rotates in this manner, the tail end of the stimulable phosphor sheet 11 is thereby pushed, and the leading end portion (i.e. the upper end portion) of the stimulable phosphor sheet 11 projects out of the cassette 210 through the opening 12a of the box member 12. The projected leading end portion of the stimulable phosphor sheet 11 is sandwiched between a pair of sheet conveyor rollers 146 of the radiation image read-out apparatus 340.

When the cassette 210 has been loaded to the predetermined position in the radiation image read-out apparatus 340, the operation for releasing the lock of the cover member 13, the operation for opening the cover member 13, and the operation for discharging a portion of the stimulable phosphor sheet 11 are effected automatically in the manner described above. In the manner described above, the lock releasing, the cover opening, and the discharging of the portion of the stimulable phosphor sheet 11 may be carried out by utilizing the force for loading the cassette 210 to the radiation image read-out apparatus 340. Alternatively, the lock releasing pin 41 may be moved by a driving means after the cassette 210 has been loaded to the predetermined position. However, in cases where the lock releasing, the cover opening, and the discharging of the portion of the stimulable phosphor sheet 11 are carried out by utilizing the cassette loading force as in the aforesaid embodiment, no driving means is required for the lock releasing pin 41. Also, the lock releasing, the cover opening, and the discharging of the portion of the stimulable phosphor sheet 11 can be completed at the time at which the cassette loading operation is finished. Therefore, the mechanism of the radiation image read-out apparatus 340 can be kept simple, and the operations thereof can be carried out quickly.

As can be understood from the foregoing, in the cassette 210 of this embodiment, the slider 14 serves as a movable member of the cover opening mechanism, and the sheet discharging means is constituted of the rod 217, the rotatable member 218, and the spring 9.

When a photoelectric sensor, or the like, detects that the cassette 210 has been loaded to the predetermined position, the pair of the sheet conveyor rollers 146 is operated in accordance with an output signal generated by the sensor. The stimulable phosphor sheet 11 is thereby completely conveyed out of the cassette 210. When the state, in which the stimulable phosphor sheet 11 has been completely conveyed out of the cassette 210, is detected by a known sensor and indicated by an indicator lamp, or the like, the operator of the apparatus releases his hand from the cassette 210. As a result, the rotatable member 218 is returned to the original position shown in FIG. 17A by the tensile force of the spring 9 located in the cassette 210. Also, when the rotatable member 218 rotates in this manner, the cassette 210 is thereby caused to move a predetermined distance downwardly.

The cassette 210 having thus been moved down is held between the holding rollers 142, 142. Such that the cassette 210 may be held more reliably, as illustrated in FIG. 14D, the cassette 210 may be provided with a cutaway portion 10c, and the radiation image read-out apparatus 340 may be provided with a holding member 110, which comes into contact with the cutaway portion 10c from below (i.e., from the left side in FIG. 14D) and receives it. The holding member 110 is urged in the counter-clockwise rotating direction around a shaft 111 in FIG. 14D. When the cassette 210 falls, the holding member 110 comes into contact with the cutaway portion 10c and reliably holds the cassette 210. When the cassette 210 is removed from the radiation image read-out apparatus 340 in the manner described later, the holding member 110 is rotated a predetermined angle clockwise in FIG. 14D by an actuator and disengaged from the cutaway portion 10c.

As illustrated in FIG. 15, the stimulable phosphor sheet 11, which has been conveyed out of the cassette 210, is conveyed into a read-out section 136 via an erasing section 138 by a sheet conveying system, which is constituted of guide plates 147, 149, 150, 156, 158, 160, 166, 184 and nip rollers 145, 152, 154, 162, 164, 168, 170, and the like. In the read-out section 136, the radiation image stored on the stimulable phosphor sheet 11 is read out with the method disclosed in, for example, U.S. Pat. No. 4,258,264. How such a read-out operation is carried out will be briefly described hereinbelow. The stimulable phosphor sheet 11 is conveyed by the nip rollers 168 and 170 at a predetermined speed in the sub-scanning direction indicated by the arrow d in FIG. 15. A laser beam L serving as stimulating rays is radiated from a stimulating ray source 172, which may be constituted of an He—Ne laser, or the like. The laser beam L is caused to impinge upon the stimulable phosphor sheet 11 by mirrors 147, 176 and a light deflector 178, which may be constituted of a galvanometer mirror, or the like. By the operation of the light deflector 178, the laser beam L scans the stimulable phosphor sheet 11 in the main scanning direction, which is approximately normal to the sub-scanning direction indicated by the arrow d.

When the stimulable phosphor sheet 11 is exposed to the laser beam L, the exposed portion of the stimulable phosphor sheet 11 emits light in an amount proportional to the amount of energy stored thereon during its exposure to the radiation. The emitted light is guided by a light guide member 180 and detected by a photodetector 182, which may be constituted of a photomultiplier, or the like. The photodetector 182 generates an output signal S representing the radiation image stored on the stimulable phosphor sheet 11. The signal S is then fed into an image reproducing apparatus, such as a CRT display device or a light beam scanning recording apparatus, and used during the reproduction of the radiation image. In this manner, the radiation image, which was stored on the stimulable phosphor sheet 11, is reproduced as a visible image.

After the radiation image has been read out from the stimulable phosphor sheet 11, the nip rollers 168, 170, and the like, are rotated reversely, and the stimulable phosphor sheet 11 is conveyed from the read-out section 136 to the erasing section 138 provided with a plurality of erasing light sources 186, 186, . . . When the stimulable phosphor sheet 11 passes through the erasing section 138, the erasing light sources 186, 186, . . . are turned on in order to produce erasing light, and the stimulable phosphor sheet 11 is exposed to the erasing light. In this manner, energy remaining on the stimulable phosphor sheet 11 after the radiation image has been read out therefrom is released from the stimulable phosphor sheet 11, and the stimulable phosphor sheet 11 can then be reused for the recording of a radiation image.

The erased stimulable phosphor sheet 11 is conveyed by the pair of the sheet conveyor rollers 146, which now rotate reversely, into the cassette 210. At this time, as described above, the cassette 210 has moved down and the rotatable member 218 has returned to the original position. Therefore, the stimulable phosphor sheet 11, which has leaved the pair of the sheet conveyor rollers 146, falls to the predetermined housing position (i.e., the position shown in FIG. 17A) in the cassette 210. Thereafter, operations reverse to the operations for taking the stimulable phosphor sheet 11 out are carried out, and the cover closing and locking are thereby carried out on the cassette 210. Specifically, the state, in which the stimulable phosphor sheet 11 has left the pair of the sheet conveyor rollers 146 and has fallen, is detected by a photoelectric sensor, or the like, and indicated by an indicator lamp, or the like. The operator of the apparatus then pulls the cassette 210 out of the cassette receiving port 40a. Thereafter, the states of the slider 14 and the cover member 13 change in the order of FIGS. 14D, 14C, 14B, and 14A, and the closing and locking of the cover member 13 are thereby carried out.

Figure 16:
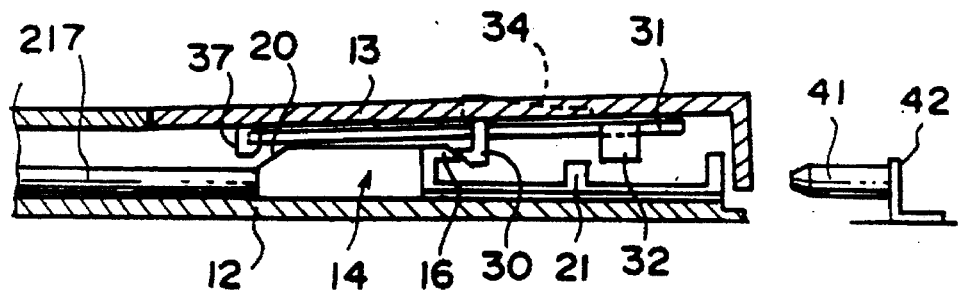
FIG. 16 is a sectional side view showing the state of the major part of the cassette of FIG. 12 when the cover member of the cassette is closed.

While the cassette 210 is being thus pulled outwardly, the cover member 13 is closed by the holding rollers 142, 142. At this time, as illustrated in FIG. 16, the locking claw 30 of the cover member 13 comes into contact with the locking claw 16 of the slider 14. When the cassette 210 is further pulled outwardly, one of the holding rollers 142, 142 pushes a portion of the upper surface (i.e., the portion indicated by a circle J drawn with the broken line in FIG. 12) approximately corresponding to the back side of the position of the locking claw 30 of the cover member 13. As a result, the locking claw 30 is caused to push the locking claw 16 down. At this time, the locking claw 16 is caused to move in the direction indicated by the arrow C by the effects of the tapered surfaces of the locking claws 30 and 16. At the time at which the cover member 13 is closed completely, the locking claw 16 is returned to the locking position by the force of the spring 9 and engaged with the locking claw 30. In this manner, when the cassette 210 is completely pulled out of the cassette receiving port 40a of the radiation image read-out apparatus 340, the locking claws 30 and 16 are reliably engaged with each other, and the cover member 13 is thereby locked.

As described above, the cover member 13 of the cassette 210 is opened when the cassette 210 is loaded into the radiation image read-out apparatus 340. The cover member 13 is also opened manually when, for example, the stimulable phosphor sheet 11 housed in the cassette 210 is to be exchanged or inspected. How the cover member 13 is opened manually will be described hereinbelow. When the cover member 13 is closed, the operating means 34, 34 of a pair of the manual operating pieces 31, 31 mounted on the cover member 13 are pushed by fingers of the operator in the direction indicated by the arrow D in FIG. 12. As a result, the protrusion 32 of each of the manual operating pieces 31, 31 pushes the corresponding protrusion 21 and thereby moves the slider 14 in the direction indicated by the arrow D. The slider 14 is thus set in the state shown in FIG. 14B, and the lock of the cover member 13 is released.

When the manual operating piece 31 is pushed and the lock is released in the manner described above, the latching piece 33 secured to the manual operating piece 31 deforms elastically, passes over the latching means 22, and is engaged with the latching means 22. Therefore, the slider 14 and the manual operating piece 31 respectively urged by the springs 9 and 36 do not return to the locking position when the operator releases his fingers from the operating means 34 of the manual operating piece 31. In this manner, the operator can release his fingers from the operating means 34 and can manually open the cover member 13.

When the cover member 13 is manually opened in the manner described above, the latching piece 33 disengages from the latching means 22, and therefore the slider 14 and the manual operating piece 31 are returned to the locking position respectively by the urging force of the springs 9 and 36. After the exchange of the stimulable phosphor sheet 11, or the like, is finished, the portion in the circle J indicated by the broken line in FIG. 12 is pushed by a finger of the operator, and the cover member 13 is thereby closed. As a result, in the same manner as that when the cover member 13 is pushed by the holding roller 142, the locking claw 30 engages with the locking claw 16, and the cover member 13 is locked in the closed state.

Even if the manual lock releasing mechanism described above is not provided, the cover member 13 can be opened manually by inserting a pin-like material into the pin passage hole 12b of the box member 12. However, the manual lock releasing mechanism should preferably be provided in order to facilitate the manual lock releasing operation.

Figure 18A:
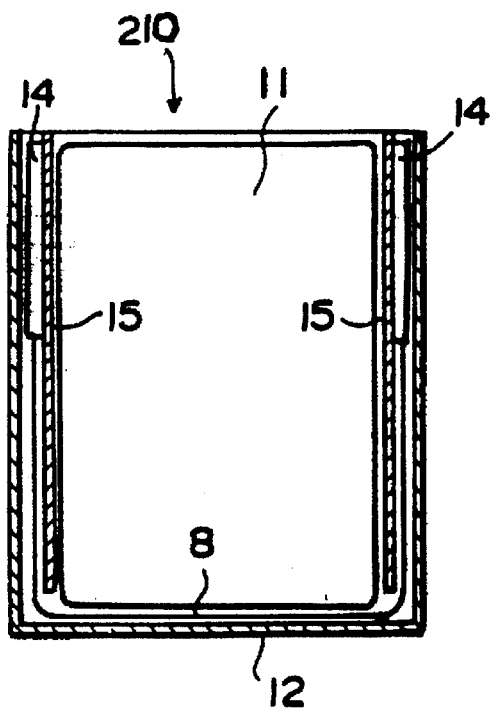
FIGS. 18A and 18B are partially cutaway plan views showing the states of a third embodiment of the cassette in accordance with the present invention when a cover member of the cassette is closed and when it is opened.
Figure 18B:
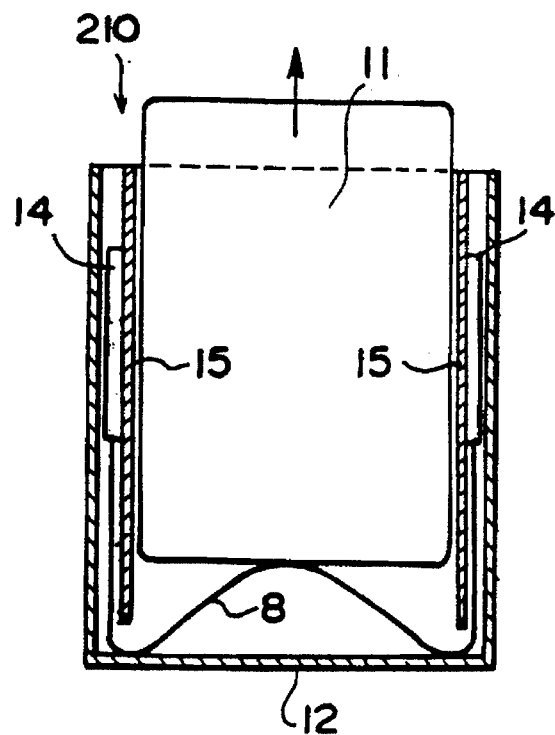

A third embodiment of the cassette in accordance with the present invention will be described hereinbelow with reference to FIGS. 18A and 18B. In FIGS. 18A and 18B, similar elements are numbered with the same reference numerals with respect to FIG. 12. FIGS. 18A and 18B show only the sheet discharging means, and the other lock releasing mechanism, the cover opening mechanism, and the like, are the same as those in the second embodiment shown in FIG. 12.

In the third embodiment, the sheet discharging means is constituted of a single flat spring member 8, the two ends of which are respectively secured to the right and left sliders 14, 14. The flat spring member 8 is constituted of a metal, a synthetic resin, or the like. As illustrated in FIG. 18A, when the cover member 13 is closed, the flat spring member 8 extends so as to surround the peripheral region of the housed stimulable phosphor sheet 11 and does not interfere with the sheet 11.

As illustrated in FIG. 18B, when the cassette 210 is loaded into the radiation image read-out apparatus 340, the right and left sliders 14, 14 are pushed towards the inner side of the cassette 210. As a result, the middle portion of the flat spring member 8 is curved towards the middle part of the cassette 210. Therefore, the stimulable phosphor sheet 11 is pushed by the curved portion of the flat spring member 8, and a portion of the stimulable phosphor sheet 11 projects out of the cassette 210.

As described above with reference to the second and third embodiments of the cassette in accordance with the present invention, the sheet discharging means provided in the cassette 210 has the very simple structure. Therefore, the cost of the cassette in accordance with the present invention, which is described above with reference to the second and third embodiments, is not much higher than the cost of a cassette provided with no such sheet discharging means. Also, the operation for discharging the stimulable phosphor sheet 11 is carried out simultaneously with the cover opening of the cassette 210. Accordingly, with the cassette 210, the operations from the cassette loading to the takeout of the stimulable phosphor sheet can be carried out quickly.

The sheet discharging means provided in the cassette in accordance with the present invention is not limited to those employed in the aforesaid second and third embodiments and may be constituted of any of other known means. Also, the cassette in accordance with the present invention, which is described above with reference to the second and third embodiments, is also applicable when a sheet-shaped image recording medium other than the stimulable phosphor sheet is housed in the cassette.

Figure 19A:
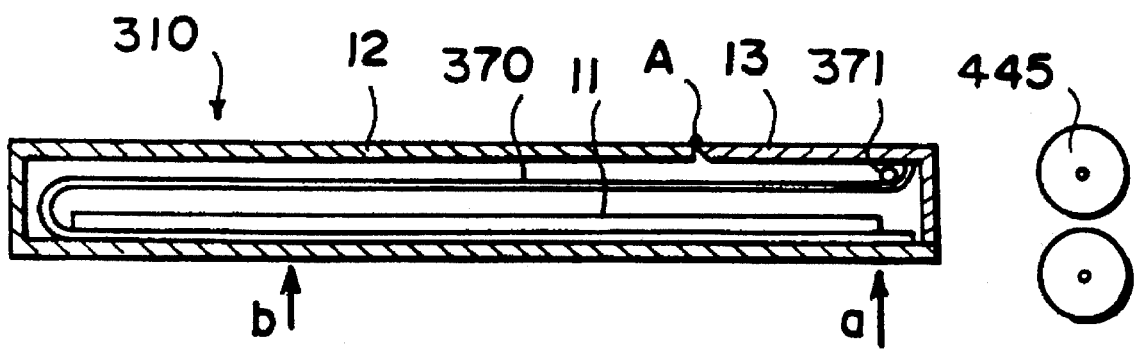
FIGS. 19A and 19B are sectional side views showing the states of a fourth embodiment of the cassette in accordance with the present invention when a cover member of the cassette is closed and when it is opened.
Figure 19B:
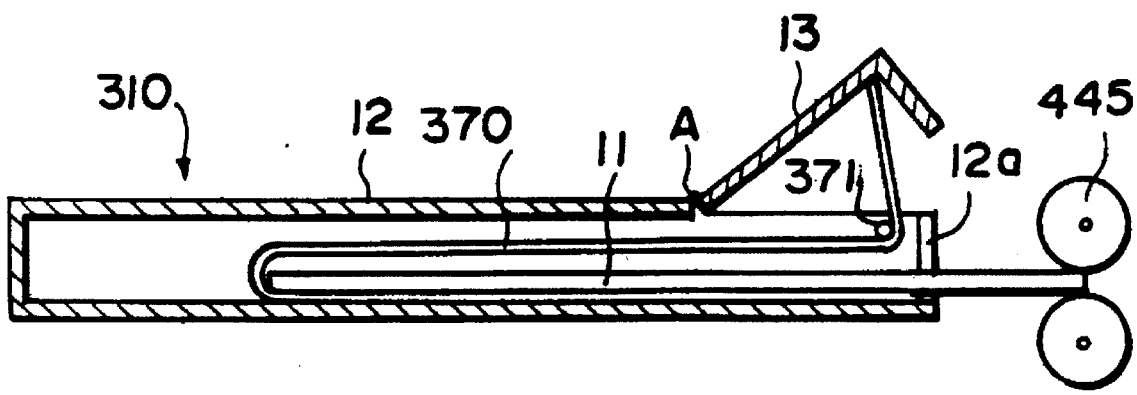

A fourth embodiment of the cassette in accordance with the present invention will be described hereinbelow with reference to FIGS. 19A and 19B. FIGS. 19A and 19B are sectional side views showing the states of the fourth embodiment of the cassette in accordance with the present invention when the cover member of the cassette is closed and when it is opened. The fourth embodiment is approximately identical with the first embodiment shown in FIG. 1, except for the features described below. In FIGS. 19A and 19B, similar elements are numbered with the same reference numerals with respect to FIG. 1.

In the fourth embodiment, as illustrated in FIG. 19A, an image recording medium feed-out member 370, which has a width approximately equal to the inner width of a cassette 310, is located in the cassette 310. By way of example, the feed-out member 370 is constituted of a nonwoven fabric, which has protecting and cushioning effects on the stimulable phosphor sheet 11 and is flexible. One end of the feed-out member 370 is secured to a portion of the inner surface of the cover member 13 in the vicinity of the front end thereof. The other end of the feed-out member 370 is secured to the inner surface of the bottom of the box member 12. The middle portion of the feed-out member 370 is turned up so as to sandwich the end of the stimulable phosphor sheet 11 having been housed in the box member 12, which end of the stimulable phosphor sheet 11 is located on the side opposite to the opening 12a. The portion of the feed-out member 370 adjacent the other end thereof, i.e., the portion extending between the points indicated by the arrows "a" and "b" in FIG. 19A, is adhered and secured to the inner surface of the bottom of the box member 12. Also, a catch shaft 371 is located at a position close to the opening 12a of the box member 12. The catch shaft 371 is parallel to the swing axis A and extends over the entire inner width of the box member 12. The one end of the feed-out member 370 passes under the catch shaft 371 and is then secured to the cover member 13 in the manner described above.

Figure 20:
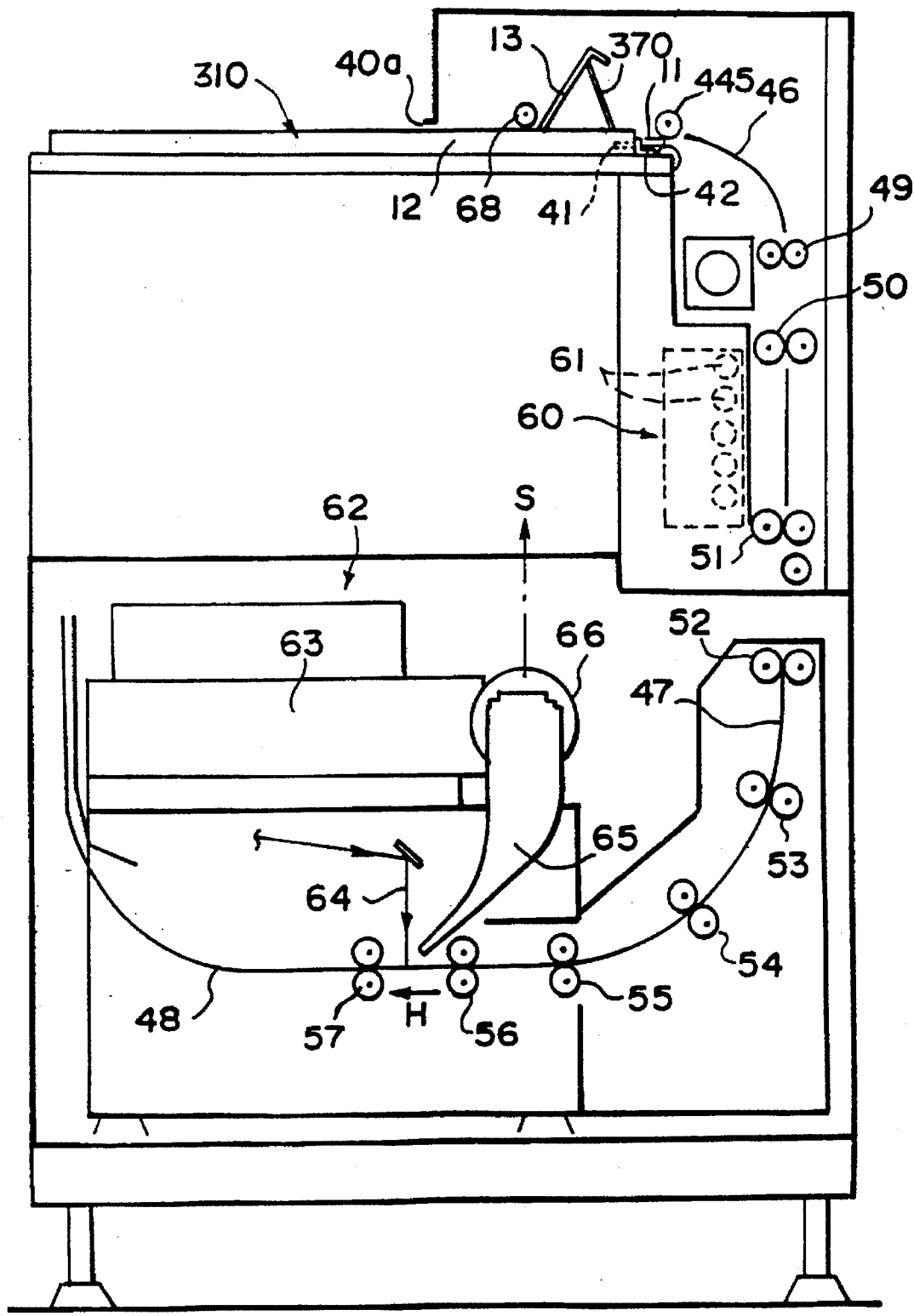
FIG. 20 is a schematic side view showing a radiation image read-out apparatus to which the cassette of FIG. 19 is loaded.

A radiation image is stored on the stimulable phosphor sheet 11 having been housed in the cassette 310, and the cassette 310 is then loaded to a radiation image read-out apparatus 440 shown in FIG. 20. The radiation image read-out apparatus 440 is constituted in the same manner as that in the radiation image read-out apparatus 40 shown in FIG. 4, except for the section at which the stimulable phosphor sheet 11 is conveyed out of and into the cassette. In FIG. 20, similar elements are numbered with the same reference numerals with respect to FIG. 4. When the cassette 310 is loaded into the radiation image read-out apparatus 440, the lock releasing and the cover opening are carried out in the order of FIGS. 3A, 3B, 3C, and 3D.

When the cassette 310 is loaded to the predetermined position in the radiation image read-out apparatus 440, the lock releasing and slight cover opening are carried out automatically. Also, the stimulable phosphor sheet 11 is slightly fed out of the cassette 310, which has thus been opened automatically. The slight feeding out is carried out automatically. How the slight feeding out is carried out will be described hereinbelow with reference to FIG. 19B.

As illustrated in FIG. 19B, when the cover member 13 is opened largely in the manner described above, the feed-out member 370 is caught by the catch shaft 371 and pulled towards the one end side of the feed-out member 370 (i.e., towards the cover member 13). As a result, the turnup portion of the feed-out member 370 moves towards the opening 12a of the box member 12. Therefore, the tail end of the stimulable phosphor sheet 11 is pushed by the turnup portion of the feed-out member 370. The leading end portion of the stimulable phosphor sheet 11 thus projects out of the opening 21a of the box member 12 and is nipped between nip rollers 445, 445 of the radiation image read-out apparatus 440.

The stimulable phosphor sheet 11, which has thus been slightly fed out of the cassette 310, is conveyed into the read-out section 62 via the erasing section 60 by a sheet conveying system shown in FIG. 20, which is constituted of the guide plates 46, 47, 48, the nip rollers 445, and other nip rollers 49, 50, 51, 52, 53, 54, 55, 56, 57, and the like.

After the radiation image has been read out from the stimulable phosphor sheet 11, the nip rollers 49 through 57 are rotated reversely, and the stimulable phosphor sheet 11 is conveyed from the read-out section 62 to the erasing section 60.

The erased stimulable phosphor sheet 11 is conveyed by the nip rollers 445, 445, which now rotate reversely, i.e. clockwise, into the cassette 310. At this time, the nip rollers 445, 445 rotate quickly in order to forcibly throw the stimulable phosphor sheet 11 into the cassette 310. Before this step, the cover opening member 43 shown in FIG. 3D returns from the position indicated by the broken line to the position indicated by the solid line and retracts transversely (i.e., in the direction heading to the rear of the plane of the sheet of FIG. 3D) away from the side inward from the cover member 13. Therefore, when the stimulable phosphor sheet 11 is thrown into the cassette 310 in the manner described above, the turnup portion of the feed-out member 370 is pushed by the stimulable phosphor sheet 11, and the cover member 13 is pulled by the feed-out member 370 and returned to the slightly open state described above.

This slightly open state of the cover member 13 is indicated on, for example, the indicator. The operator of the apparatus then pulls the cassette 310 out of the cassette receiving port 40a. As a result, in this case, the states of the slider 14 and the cover member 13 change in the order of FIGS. 3D, 3C, 3B, and 3A, and the closing and locking of the cover member 13 are thereby carried out.

Figure 21A:
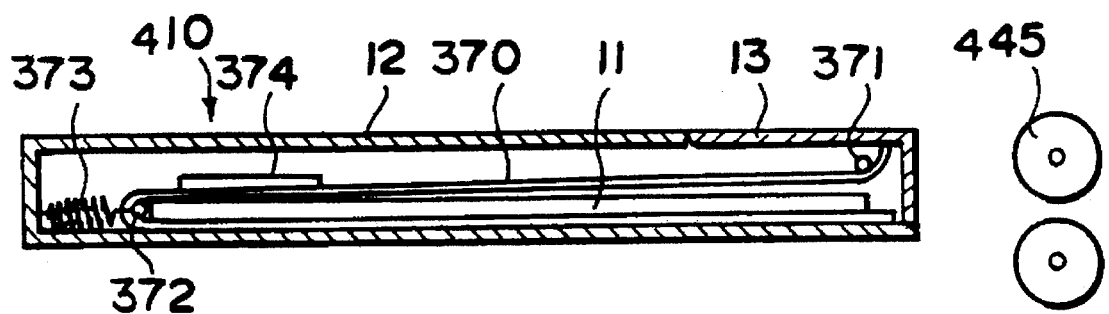
FIGS. 21A and 21B are sectional side views showing the states of a fifth embodiment of the cassette in accordance with the present invention when a cover member of the cassette is closed and when it is opened.
Figure 21B:
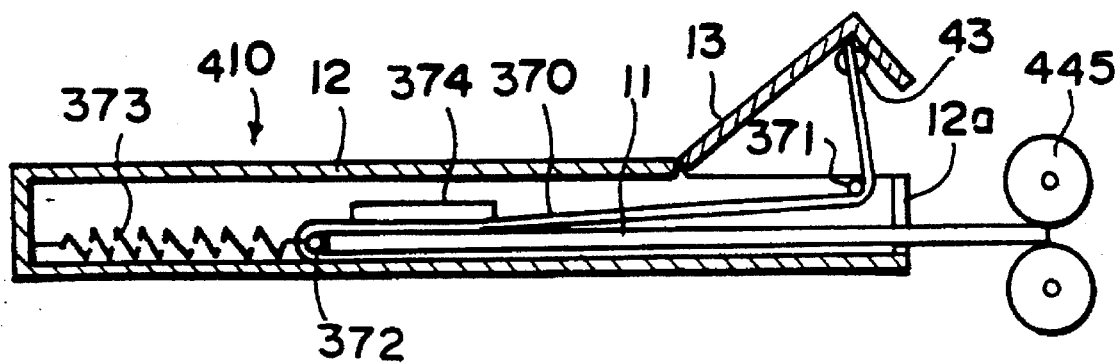

A fifth embodiment of the cassette in accordance with the present invention will be described hereinbelow with reference to FIGS. 21A and 21B. In FIGS. 21A and 21B, similar elements are numbered with the same reference numerals with respect to FIGS. 19A and 19B. (This also applies to FIGS. 22A, 22B, and 23.) In the fifth embodiment, as illustrated in FIG. 21A, a tension shaft 372 is located in a cassette 410. The tension shaft 372 is located inside of the space defined by the turnup portion of the feed-out member 370 and extends over a width not smaller than the entire width of the feed-out member 370. Each of the two ends of the tension shaft 372 is supported on one end of each of two tension coiled springs 373, 373 such that the tension shaft 372 can rotate. The other end of each of two tension coiled springs 373, 373 is secured to the box member 12. Therefore, the feed-out member 370 is urged to the side opposite to the opening 12a of the box member 12 and is kept in the tense state. Also, a magnetic material (a permanent magnet) 374 is secured to a portion of the feed-out member 370 such that, when the cover member 13 is closed, the magnetic material 374 may be located between the one end of the feed-out member 370 and the turnup portion thereof and in the vicinity of the turnup portion.

The stimulable phosphor sheet 11 housed in the cassette 410 is capable of adhering to the magnetic material 374 by magnetic attraction. For this purpose, for example, a substrate of the stimulable phosphor sheet 11 may contain a magnetic material. Alternatively, a thin magnetic material layer may be adhered to the back surface of the stimulable phosphor sheet 11 (i.e., the upper surface thereof in FIG. 21A.

The stimulable phosphor sheet 11 is taken out of the cassette 410 in the same manner as that in the cassette 310 shown in FIGS. 19A and 19B. When the stimulable phosphor sheet 11 is housed in the cassette 410, the nip rollers 445, 445 rotate at a comparatively low speed. Therefore, as illustrated in FIG. 21B, when the stimulable phosphor sheet 11 is conveyed by the nip rollers 445, 445 into the cassette 410 and the tail end (in this case, the right end in FIG. 21B) of the stimulable phosphor sheet 11 leaves the nip rollers 445, 445, the stimulable phosphor sheet 11 stops in such a state that the portion thereof adjacent the tail end may remain on the side outward from the cassette 410. In such a state, the leading end portion (in this case, the left end portion in FIG. 21B) of the stimulable phosphor sheet 11 adheres to the magnetic material 374 of the feed-out member 370.

Thereafter, the cover opening member 43, which has been located on the side inward from the cover member 13 after the cover member 13 was opened, is moved down so as to return to the original position, the feed-out member 370 is pulled by the coiled spring 373, and the turnup portion moves in the direction heading away from the opening 12a (i.e., leftwardly in FIG. 21B). Therefore, the stimulable phosphor sheet 11, which adheres to the magnetic material 374 secured to the feed-out member 370, is pulled in the same direction. At the time at which the cover member 13 has thus been closed, the stimulable phosphor sheet 11 is completely housed in the box member 12.

In the fourth and fifth embodiments of the cassette in accordance with the present invention, the feed-out member 370 is constituted of the nonwoven fabric. Alternatively, it may be constituted of a synthetic resin film, a thread, or the like.

A sixth embodiment of the cassette in accordance with the present invention will be described hereinbelow with reference to FIGS. 22A and 22B. In the sixth embodiment, an image recording medium feed-out member 380, which is capable of deforming elastically, is located in a cassette 510. The feed-out member 380 may be constituted of a thin stainless steel sheet, a thin phosphor bronze sheet, a synthetic resin sheet, or the like. One end of the feed-out member 380 is secured to the cover member 13, and the magnetic material 374 is secured to the other end of the feed-out member 380. The feed-out member 380 passes under the catch shaft 371.

Figure 22A:
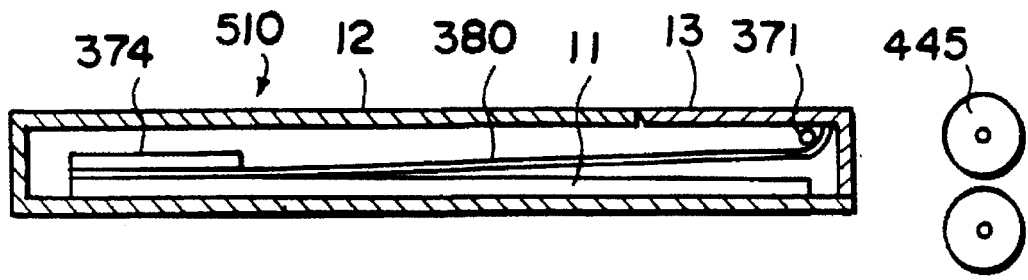
FIGS. 22A and 22B are sectional side views showing the states of a sixth embodiment of the cassette in accordance with the present invention when a cover member of the cassette is closed and when it is opened.
Figure 22B:
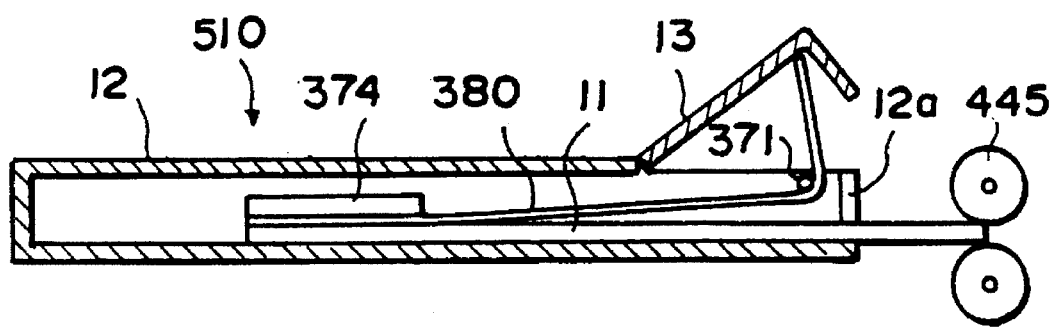

As illustrated in FIG. 22A, when the cover member 13 is closed, the stimulable phosphor sheet 11, which is of the same type as that housed in the cassette 510 in the fifth embodiment, adheres to the magnetic material 374 with the feed-out member 380 intervening therebetween. As illustrated in FIG. 22B, when the cover member 13 is opened, the feed-out member 380 is caught by the catch shaft 371 and is pulled towards the one end thereof, i.e., towards the cover member 13. As a result, the magnetic material 374 adhered to the other end of the feed-out member 380 moves towards the opening 12a of the box member 12, and the stimulable phosphor sheet 11 adhered to the magnetic material 374 is fed out to the position that is nipped between the nip rollers 445, 445.

When the stimulable phosphor sheet 11 is housed in the cassette 510, the stimulable phosphor sheet 11, which has leaved the nip rollers 445, 445, is adhered to the magnetic material 374 with the feed-out member 380 intervening therebetween. When the cover member 13 is then closed, the feed-out member 380 is pushed towards the other end side thereof, and the magnetic material 374 moves in the direction heading away from the opening 12a of the box member 12 (i.e., leftwardly in FIG. 22B). Therefore, the stimulable phosphor sheet 11 adhered to the magnetic material 374 moves towards the inner part of the box member 12. When the cover member 13 has thus been closed, the stimulable phosphor sheet 11 is completely housed in the box member 12.

When the stimulable phosphor sheet 11 is housed in the cassette 510, the sheet 11 will rub against the lower surface of the feed-out member 380. In order to prevent the stimulable phosphor sheet 11 from being scratched due to the rubbing, a coating layer of a resin, or the like, should preferably be overlaid on the lower surface of the feed-out member 380.

Figure 23:
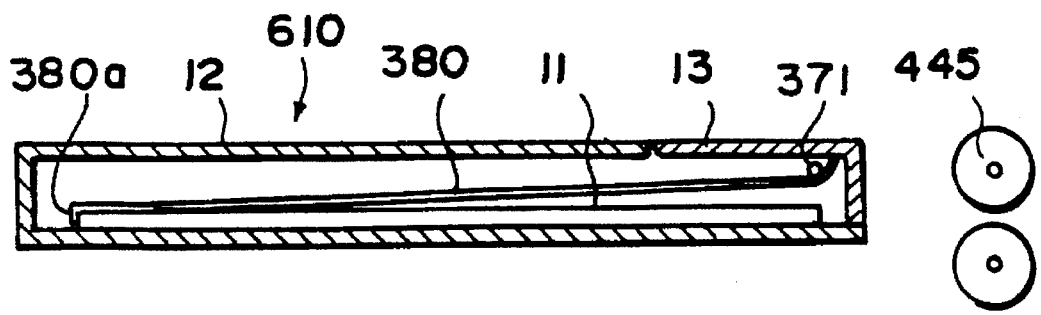
FIG. 23 is a sectional side view showing a seventh embodiment of the cassette in accordance with the present invention.

A seventh embodiment of the cassette in accordance with the present invention will be described hereinbelow with reference to FIG. 23. A cassette 610 of the seventh embodiment differs from the cassette 510 of the sixth embodiment in that the magnetic material 374 is not provided, and in that the feed-out member 380 is provided with a bent portion 380a. The bent portion 380a serves as a means for engaging with the stimulable phosphor sheet 11. When the cover member 13 of the cassette 610 is opened, the bent portion 380a of the feed-out member 380 is pulled towards the cover member 13 and pushes the tail end face of the stimulable phosphor sheet 11 (in this case, the left end face thereof in FIG. 23). Therefore, the sheet 11 projects out of the cassette 610.

With the cassette 610 of the seventh embodiment and the cassette 310 of the fourth embodiment, a means for adhering to and holding the stimulable phosphor sheet 11 is not provided in the box member 12. Therefore, it is difficult for the cassette 610 or 310 to be loaded into the cassette utilizing apparatus such that the opening 12a of the box member 12 may stand facing down. On the other hand, with the cassette 410 of the fifth embodiment and the cassette 510 of the sixth embodiment, the stimulable phosphor sheet 11 can be held by magnetic attraction in the box member 12, and therefore the cassette 410 or 510 can be loaded into the cassette utilizing apparatus such that the opening 12a of the box member 12 may stand facing down.

In the aforesaid fourth, fifth, sixth, and seventh embodiments of the cassette in accordance with the present invention, the stimulable phosphor sheet 11 is housed. The cassette in accordance with the present invention is also applicable when an image recording medium, e.g. X-ray photographic film, other than the stimulable phosphor sheet is housed in the cassette.

Figure 24:
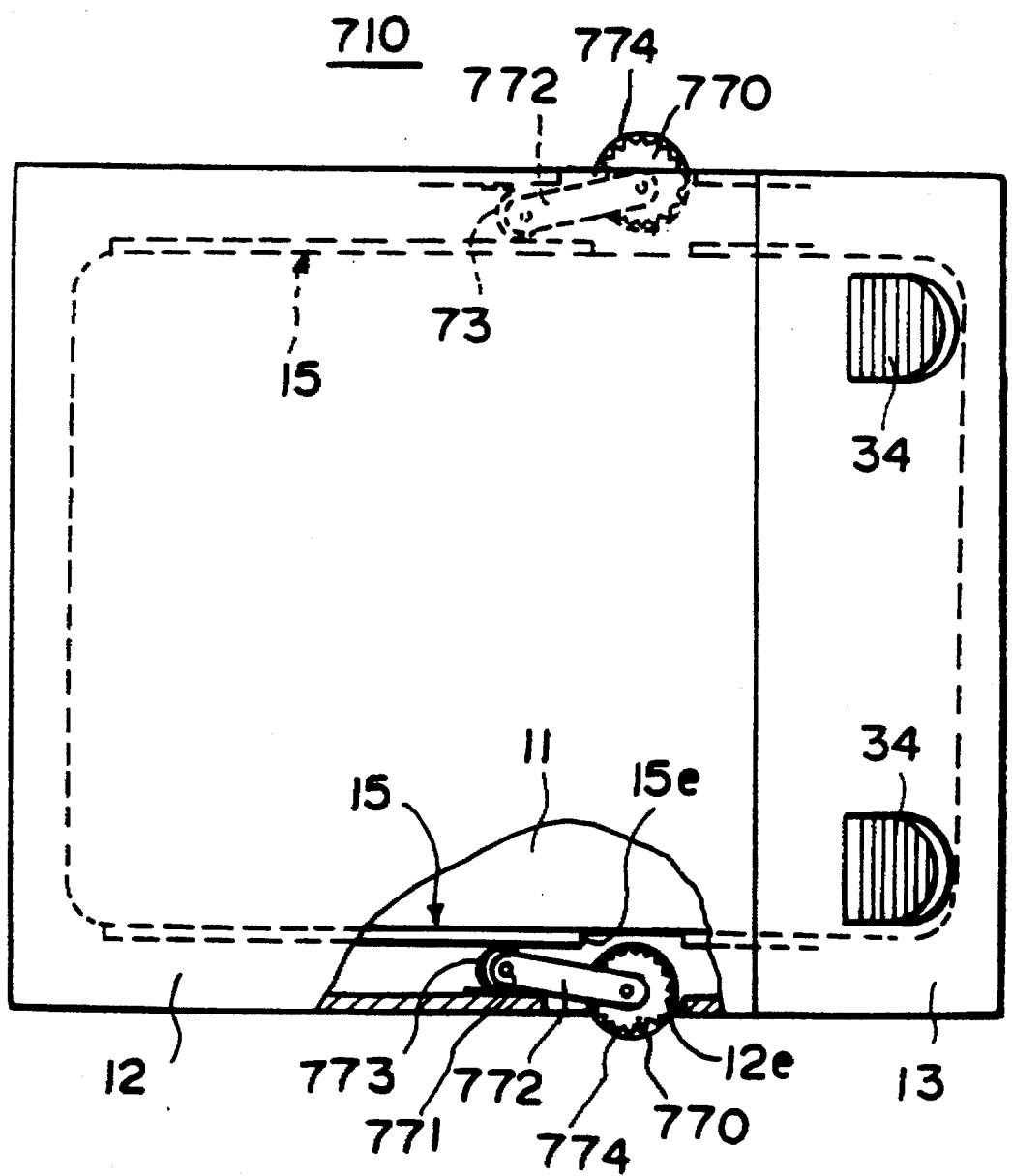
FIG. 24 is a partially cutaway plan view showing an eighth embodiment of the cassette in accordance with the present invention.

An eighth embodiment of the cassette in accordance with the present invention will be described hereinbelow with reference to FIG. 24. FIG. 24 is a plan view showing a cassette 710 of the eighth embodiment. The structure of the cassette 710 is approximately identical with that of the cassette 10 shown in FIG. 1. In FIG. 24, similar elements are numbered with the same reference numerals with respect to FIG. 1. In this embodiment, the cover opening member 43 shown in FIG. 3D is not provided.

As illustrated in FIG. 24, in this embodiment, the pair of the guide members 15, 15, which serves as inner frames of the cassette 710, respectively have cutaway portions 15e, 15e. The two side walls of the box member 12 are respectively provided with openings 12e, 12e at positions which stand facing the cutaway portions 15e, 15e from the sides outward from the cutaway portions 15e, 15e. Each of pinions 770, 770 serving as the movable member is located between each opening 12e and the corresponding cutaway portion 15e. Each pinion 770 is supported on a support member 772 such that the pinion 770 can rotate in a plane parallel to the stimulable phosphor sheet 11. The support member 772 swings around a shaft 771. The support member 772 is urged by a torsion coil spring 773, which is associated with the shaft 771, such that the leading end of the support member 772 may move outwardly from the side of the box member 12. Therefore, when receiving no other external force, each pinion 770 is kept in such a state that a-portion thereof may slightly project from the opening 12e.

Figure 26:
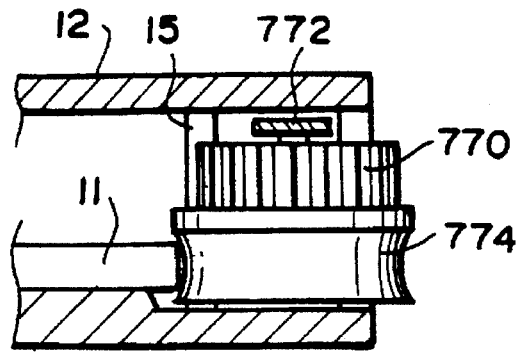
FIG. 26 is a vertical sectional view showing part of the cassette of FIG. 24, FIGS. 27A, 27B, and 27C are sectional plan views showing how a portion of a stimulable phosphor sheet is pulled out of the cassette of FIG. 24.

As illustrated in FIG. 26, a roller 774 serving as the sheet transfer mechanism is secured to each pinion 770 such that they may be coaxial with each other. The roller 774 has a pulley-like outer shape, and the circumferential surface thereof is constituted of a material, such as rubber, which has a comparatively large coefficient of friction with respect to the side end face of the stimulable phosphor sheet 11.

Figure 25:
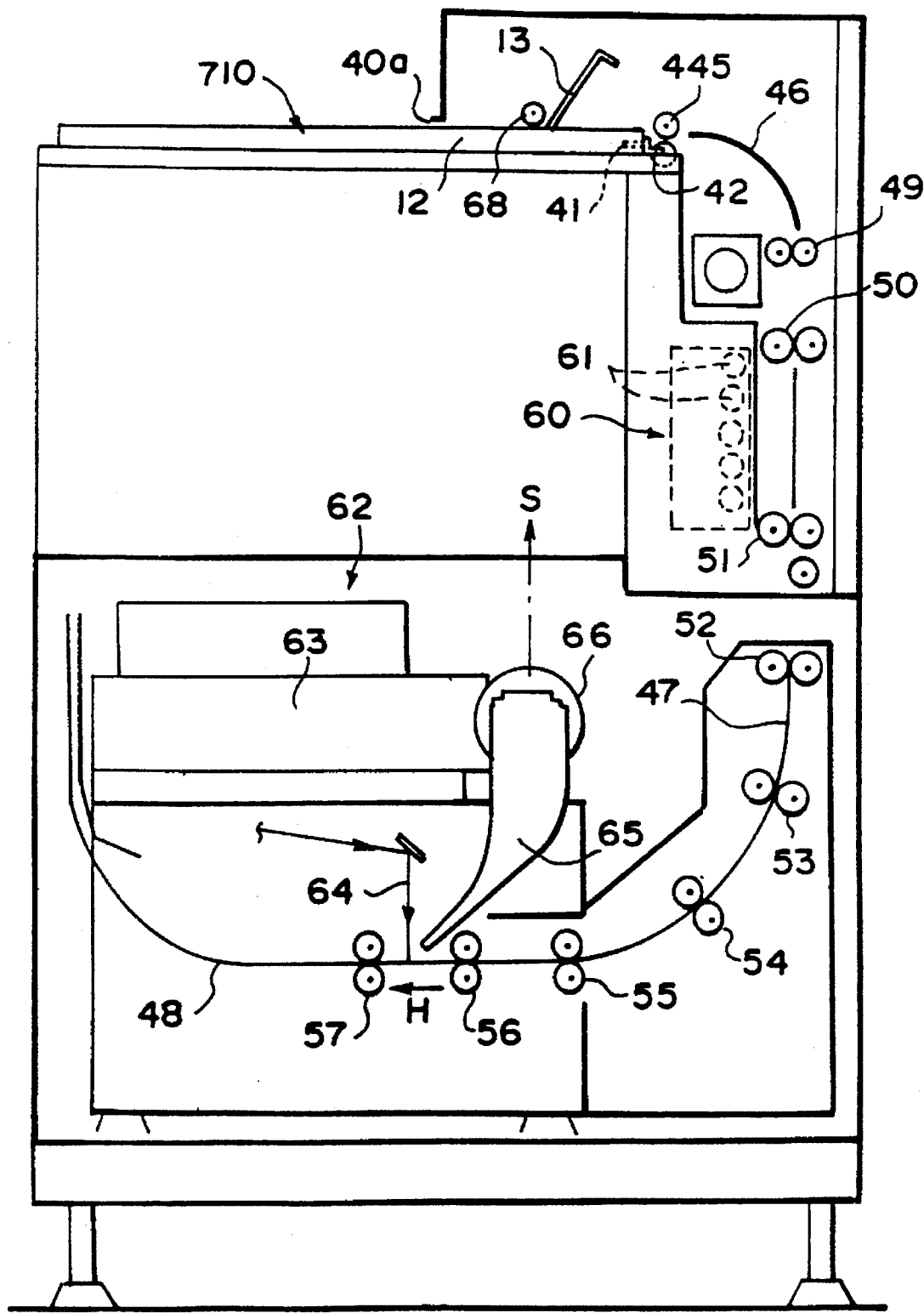
FIG. 25 is a schematic side view showing a radiation image read-out apparatus to which the cassette of FIG. 24 is loaded.

A radiation image is stored on the stimulable phosphor sheet 11 having been housed in the cassette 710, and the cassette 710 is then loaded to a radiation image read-out apparatus 540 shown in FIG. 25. The radiation image read-out apparatus 540 is constituted in the same manner as that in the radiation image read-out apparatus 40 shown in FIG. 4, except for the section at which the stimulable phosphor sheet 11 is conveyed out of and into the cassette. In FIG. 25, similar elements are numbered with the same reference numerals with respect to FIG. 4. When the cassette 710 is loaded into the radiation image read-out apparatus 540, the lock releasing and the cover opening are carried out in the order of FIGS. 3A, 3B, and 3C, and FIG. 7 (which corresponds to FIG. 3D).

When the cassette 710 is loaded to the predetermined position in the radiation image read-out apparatus 540, the lock releasing and slight cover opening are carried out automatically. Also, the stimulable phosphor sheet 11 is slightly fed out of the cassette 710, which has thus been opened automatically. The slight feeding out is carried out automatically. How the slight feeding out is carried out will be described hereinbelow with reference to FIGS. 27A, 27B, and 27C.

Figure 27A:
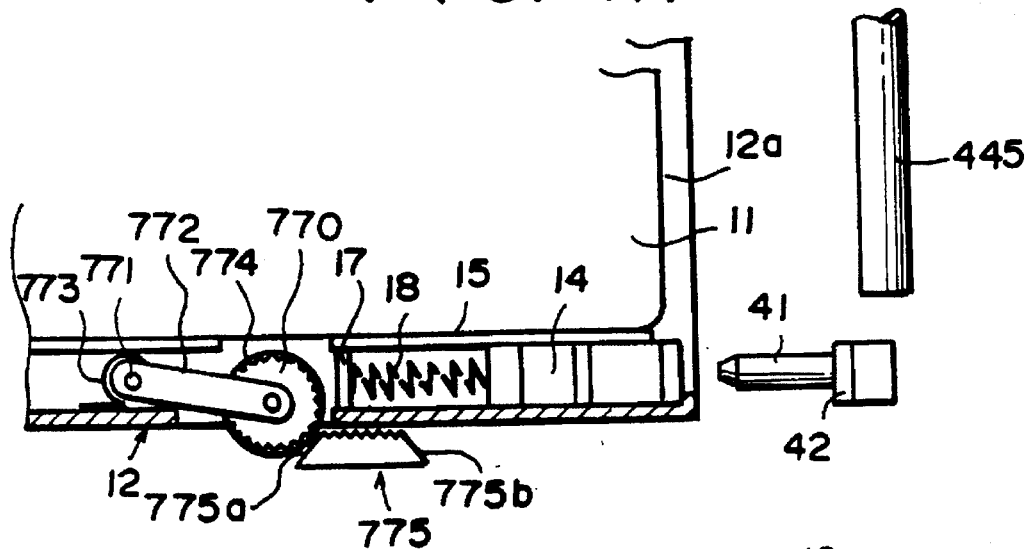
Figure 27B:
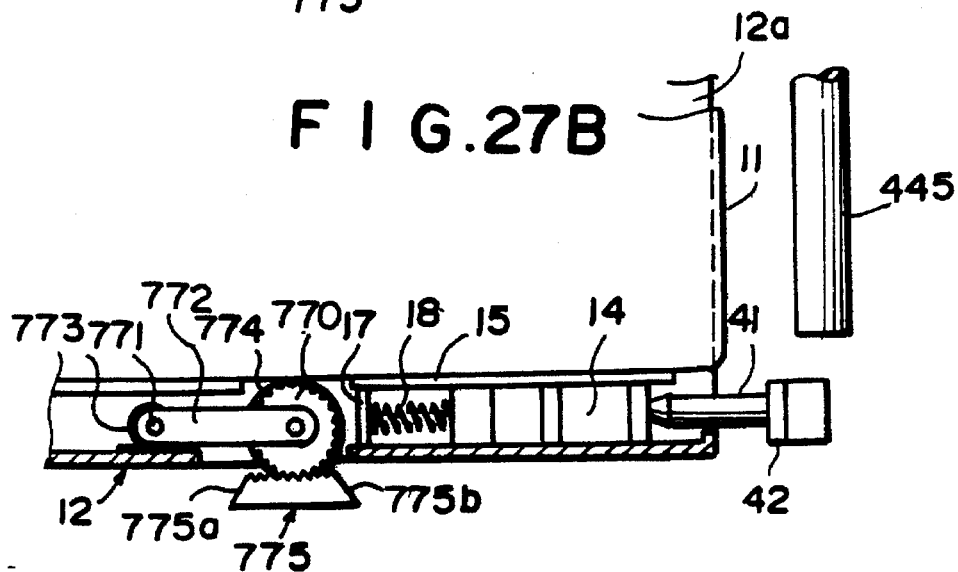

A pair of racks 775, 775 extending in the direction of cassette loading are secured to the radiation image read-out apparatus 540. The racks 775, 775 are located at positions such that they can engage with the pinions 770, 770 of the loaded cassette 710. Each of the racks 775, 775 is provided with slant surfaces 775a and 775b at the two ends. As illustrated in FIG. 27A, when the lock releasing pin 41 is not in contact with the slider 14, each rack 775 is located at the position which does not engage with the pinion 770. When the cassette 710 is pushed into the radiation image read-out apparatus 540, the lock releasing pin 41 pushes the slider 14. As illustrated in FIG. 27B, when the cover member 13 thus begins to open the opening 12a, the pinion 770 becomes engaged with the rack 775. Before this engaging step, the pinion 770 goes on the slant surface 775a of the rack 775, is pushed by the slant surface 775a, and moves towards the inner part of the box member 12 against the urging force of the torsion coil spring 773. When the pinion 770 engages with the rack 775, the groove formed in the circumferential surface of the roller 774 comes into close contact with the side end face of the stimulable phosphor sheet 11.

When the cassette 710 is then further pushed into the radiation image read-out apparatus 540, each pinion 770 engaged with the corresponding rack 775 rotates, and therefore the roller 774 rotates. The tangential force of the roller 774 which thus rotates is transmitted to the stimulable phosphor sheet 11 through frictional engagement therebetween. In this manner, the stimulable phosphor sheet 11 is moved forwardly in the direction of cassette loading, i.e. towards the opening 12a of the box member 12.

Figure 27C:
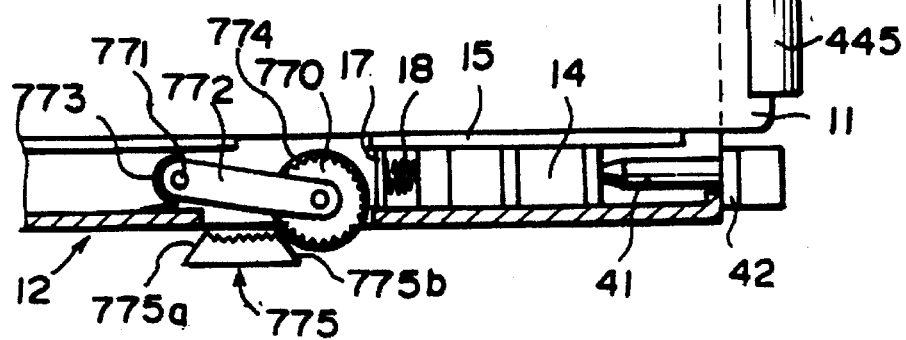

In the manner described above, the stimulable phosphor sheet 11 is fed out accompanying the operation for pushing the cassette 710 into the radiation image read-out apparatus 540. As illustrated in FIG. 27C, when the front end of the cassette 710 is brought into contact with the stopper 42, the leading end of the stimulable phosphor sheet 11 projects out of the opening 12a of the box member 12 and is nipped between the nip rollers 445, 445 of the radiation image read-out apparatus 540.

In this state, the pinion 770 has passed over the rack 775 and leaves the threaded area thereof. Also, the pinion 770 and the roller 774 are moved outwardly by the urging force of the torsion coil spring 773, and the roller 774 separates from the side end face of the stimulable phosphor sheet 11. Therefore, after the cassette 710 becomes empty, the stimulable phosphor sheet 11 can be conveyed easily into the empty cassette 710 in the manner described later.

The stimulable phosphor sheet 11, which has been slightly fed out of the cassette 710 in the manner described above, is conveyed into the read-out section 62 via the erasing section 60 by the sheet conveying system shown in FIG. 25, which is constituted of the guide plates 46, 47, 48, the nip rollers 445, and other nip rollers 49, 50, 51, 52, 53, 54, 55, 56, 57, and the like.

After the radiation image has been read out from the stimulable phosphor sheet 11, the nip rollers 49 through 57 are rotated reversely, and the stimulable phosphor sheet 11 is conveyed from the read-out section 62 to the erasing section 60.

The erased stimulable phosphor sheet 11 is conveyed by the nip rollers 445, 445, which now rotate reversely, into the cassette 710. Thereafter, operations reverse to the operations for taking the stimulable phosphor sheet 11 out are carried out, and the cover closing and locking are thereby carried out on the cassette 710. Specifically, when the stimulable phosphor sheet 11 is conveyed by the nip rollers 445, 445 into the cassette 710 and the tail end of the stimulable phosphor sheet 11 leaves the nip rollers 445, 445, the stimulable phosphor sheet 11 stops in such a state that the portion thereof adjacent the tail end may remain on the side outward from the cassette 710.

By way of example, an indicator indicates that the conveyance of the stimulable phosphor sheet 11 has ceased in the manner described above. The operator of the apparatus then pulls the cassette 710 out of the cassette receiving port 40a. As a result, in this case, the pinion 770 goes on the slant surface 775b and then engages with the rack 775, and the groove formed on the circumferential surface of the roller 774 is brought into close contact with the side end face of the stimulable phosphor sheet 11. When the cassette 710 is further pulled out of the cassette receiving port 40a, the pinion 770 engaged with the rack 775 rotates reversely to the direction, along which it rotated during the cassette loading. The roller 774 also rotates in the same direction as the pinion 770, and therefore the stimulable phosphor sheet 11 is fed towards the inner part of the cassette 710. When the cassette 710 is pulled out until the pinion 770 leaves the slant surface 775a of the rack 775, the stimulable phosphor sheet 11 is completely housed in the box member 12.

When the cassette 710 is pulled out in the manner described above, the states of the slider 14 and the cover member 13 change in the order of FIGS. 7, 3C, 3B, and 3A, and the closing and locking of the cover member 13 are thereby carried out.

Figure 28:
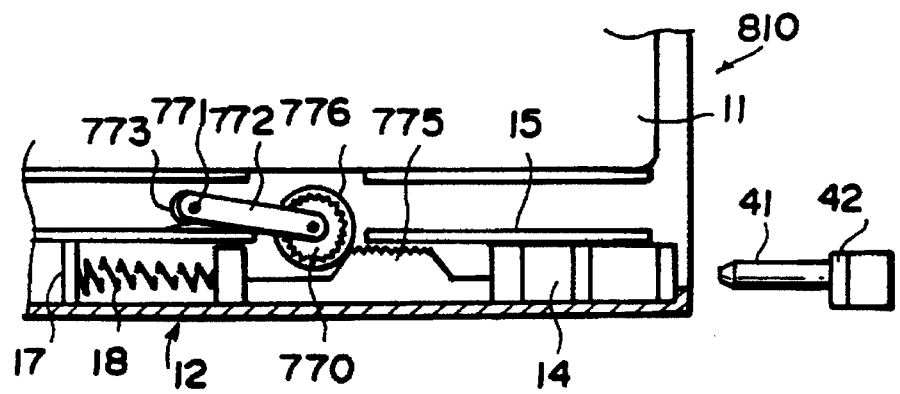
FIG. 28 is a partially cutaway plan view showing a ninth embodiment of the cassette in accordance with the present invention.
Figure 29:
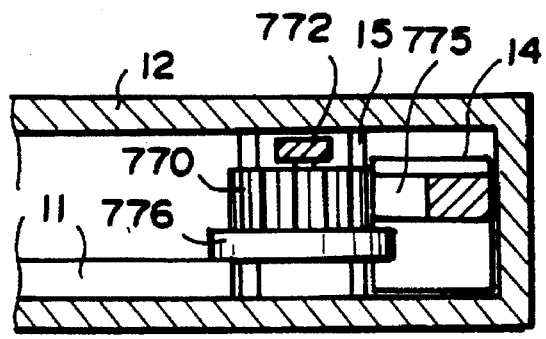
FIG. 29 is a vertical sectional view showing part of the cassette of FIG. 28.

A ninth embodiment of the cassette in accordance with the present invention will be described hereinbelow with reference to FIGS. 28 and 29. In FIGS. 28 and 29, similar elements are numbered with the same reference numerals with respect to FIGS. 24 and 27A. (This also applies to FIGS. 30, 31A, 31B, and 32.) In a cassette 810 of the ninth embodiment, a rack 775 which is identical with that shown in FIG. 24 is secured to the slider 14. In this embodiment the movable member is constituted of the slider 14, the pinion 770, and the rack 775. Also, the sheet transfer mechanism is constituted of a disk-like magnetic material 776, which is secured to the pinion 770 coaxially therewith. The stimulable phosphor sheet 11, which is housed in the cassette 810 of the ninth embodiment, is provided with a magnetic material layer, which is formed on the back surface (i.e, the upper surface in FIG. 29) at the side end portion of the sheet 11.

When the cassette 810 is loaded into, for example, the radiation image read-out apparatus 540 shown in FIG. 25 and the lock releasing pin 41 of the read-out apparatus 540 pushes the slider 14, the rack 775 moves linearly, engages with the pinion 770, and rotates the pinion 770. At this time, the pinion 770 moves towards the inner side of the cassette 810, and therefore the magnetic material 776 adheres to the back surface of the stimulable phosphor sheet 11. When the pinion 770 rotates in the manner described above, the disk-like magnetic material 776 also rotates, and the tangential force of the disk-like magnetic material 776 is transmitted to the stimulable phosphor sheet 11, which is engaged with the disk-like magnetic material 776 by magnetic attraction. Therefore, the stimulable phosphor sheet 11 is fed out of the opening 12a of the box member 12. When the cassette 810 is pulled out of the radiation image read-out apparatus 540, the pinion 770 and the disk-like magnetic material 776 rotates reversely to the direction of the aforesaid rotation, and the stimulable phosphor sheet 11 is thereby completely housed in the cassette 810.

The mechanism for transferring the stimulable phosphor sheet 11 by engaging the sheet 11 and the disk-like magnetic material 776 with each other by magnetic attraction may be employed in lieu of the roller 774 in the cassette 710 shown in FIG. 24. Also, in the cassette 810 of the ninth embodiment, the roller 774 provided in the cassette 710 shown in FIG. 24 may be employed in lieu of the aforesaid sheet transfer mechanism.

Figure 30:
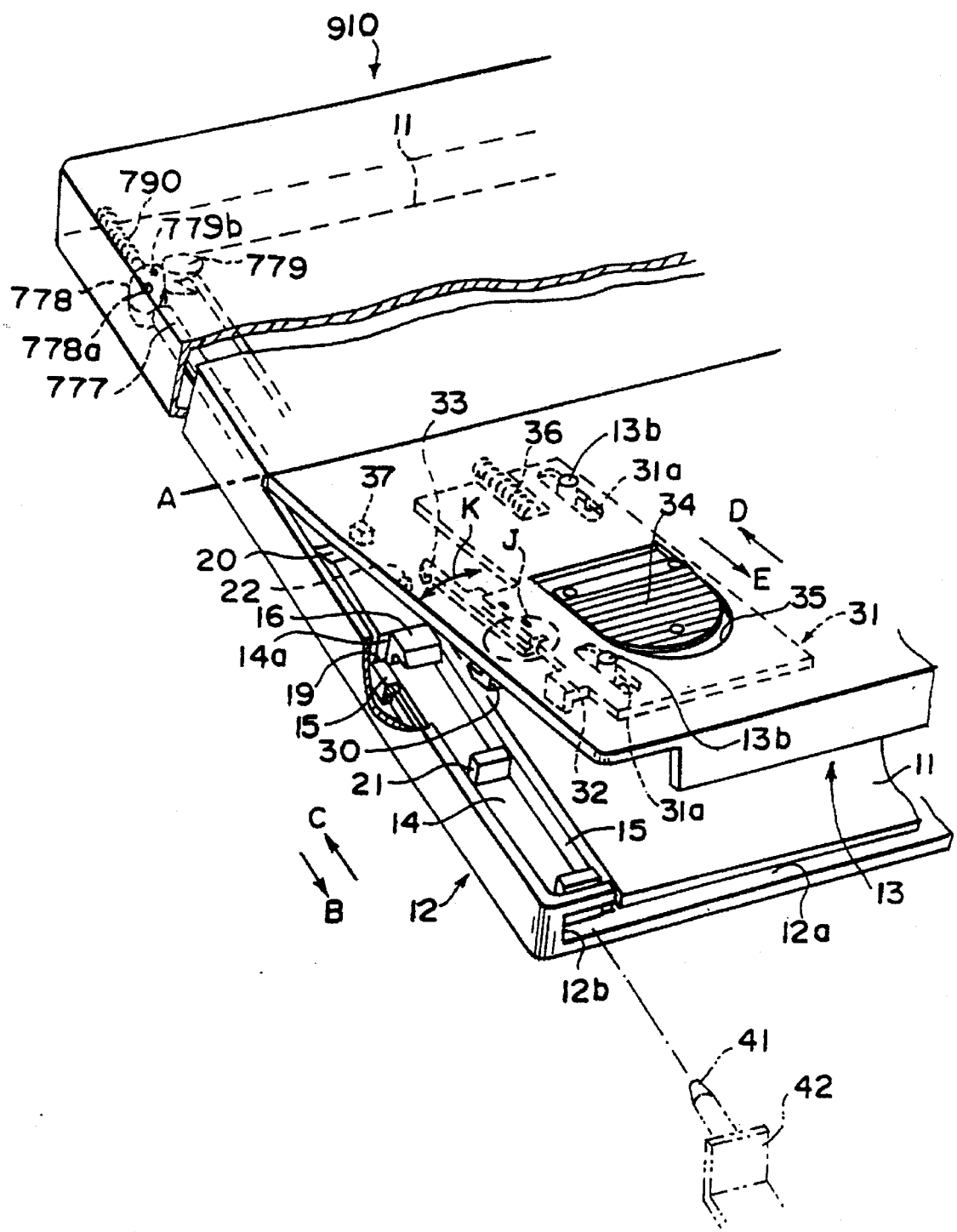
FIG. 30 is a perspective view showing a tenth embodiment of the cassette in accordance with the present invention.

A tenth embodiment of the cassette in accordance with the present invention will be described hereinbelow with reference to FIGS. 30, 31A, 31B and 32. As illustrated in FIG. 30, in a cassette 910, an elongated rod 777 is secured to the slider 14. The rod 777 extends in the direction, along which the slider 14 moves, up to the vicinity of the end of the box member 12 opposite to the opening 12a. In the box member 12, an elliptic rotatable member 778 is supported such that it may be in contact with the leading end of the rod 777 and can rotate around a rotation shaft 778a, which extends in the thickness direction of the cassette 910. Also, a clip 779 is supported on the rotatable member 778 such that it can swing around a swing shaft 779b, which is parallel to the rotation shaft 778a.

Figure 31A:
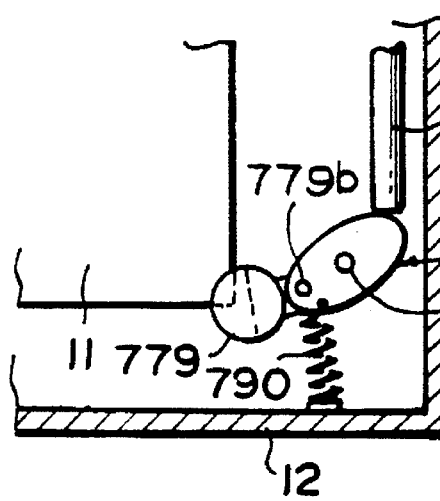
FIGS. 31A and 31B are partially cutaway plan views showing how the major part of the cassette of FIG. 30 works when a cover member of the cassette is closed and when it is opened.
Figure 31B:
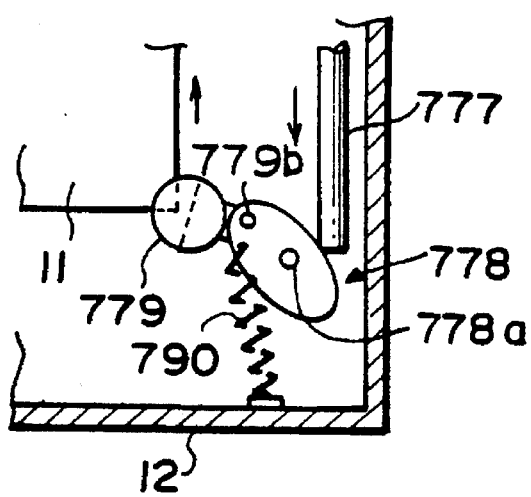

FIGS. 31A and 31B shows different states of the parts around the rotatable member 778. As illustrated in FIG. 31A, one end of a tension coiled spring 790 is secured to the box member 12, and the other end of the spring 790 is engaged with the rotatable member 778. The rotatable member 778 is pulled by the spring 790 and urged in the counter-clockwise rotating direction in FIG. 31A. Therefore, the slider 14 is urged towards the front end of the cassette 910 (i.e. in the direction indicated by the arrow B in FIG. 30). When receiving no other external force, the slider 14 thus urged is kept at the position (the locking position) at which the overhang 14a of the slider 14 comes into contact with the stopper 19 formed on the guide member 15.

Figure 32:
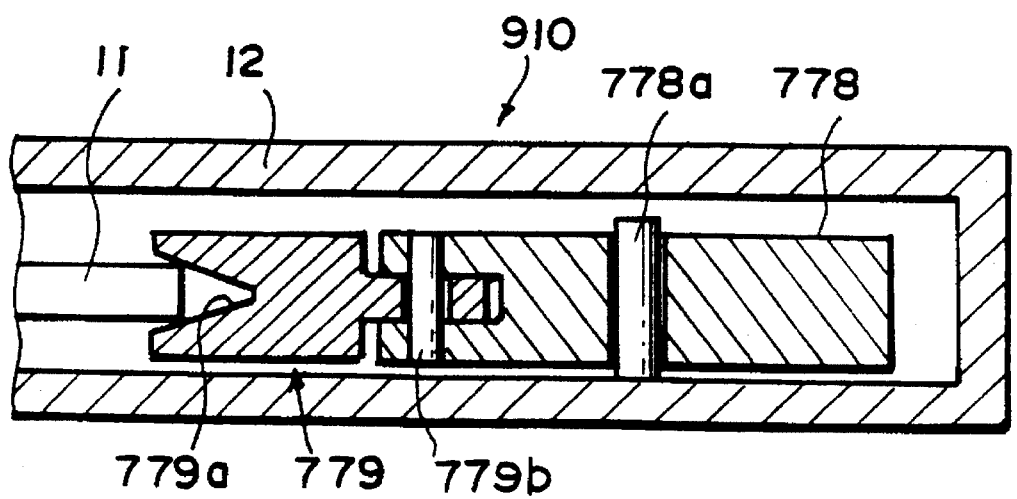
FIG. 32 is a vertical sectional view showing part of the cassette of FIG. 30.

As illustrated in FIG. 32, the clip 779 is provided with a groove 779a, which has an approximately V-shaped cross-section and is formed on the side surface facing the stimulable phosphor sheet 11. The groove 779a clips the end of the stimulable phosphor sheet 11. Therefore, unlike the eighth and ninth embodiment of the cassette in accordance with the present invention, in the cassette 910 of the tenth embodiment, the stimulable phosphor sheet 11 is reliably held by the groove 779a as long as the sheet 11 is housed in the cassette 910. Accordingly, for example, when the cover member 13 is opened by the aforesaid manual operation, the stimulable phosphor sheet 11 does not slide and fall from the cassette 910 by mistake.

How the cassette 910 operates will be described hereinbelow. The cassette 910 is loaded into the radiation image read-out apparatus 540 shown in FIG. 25. At this time, the lock releasing and opening of the cover member 13 and the closing and locking of the cover member 13 during the removal of the cassette 910 from the radiation image read-out apparatus 540 are carried out in the same manner as that in the cassette 710 of the eighth embodiment.

When the cassette 910 is loaded into the radiation image read-out apparatus 540, the stimulable phosphor sheet 11 is fed out in the manner described below. When the cassette 910 is loaded to the radiation image read-out apparatus 540, the lock releasing pin 41 secured to the apparatus 540 passes through the pin passage hole 12b, which is formed in the box member 12 as shown in FIG. 30, and enters the box member 12. The lock releasing pin 41 pushes the slider 14 towards the inner part of the cassette 910 (i.e., in the direction indicated by the arrow C in FIG. 30) against the urging force of the spring 790. When the slider 14 moves in this manner, the leading end of the rod 777 pushes the rotatable member 778, and therefore the rotatable member 778 rotates clockwise in FIG. 31A against the urging force of the spring 790. When the cover member 13 is closed, the rotatable member 778 is located at the position shown in FIG. 31A. When the front end of the cassette 910 is brought into contact with the stopper 42, the rotatable member 778 rotates to the position shown in FIG. 31B. When the rotatable member 778 rotates in this manner, The clip 779 swings with respect to the rotatable member 778 and is pushed forwardly. Therefore, the leading end portion of the stimulable phosphor sheet 11, which is clipped by the clip 779, projects out of the cassette 910 through the opening 12a of the box member 12. The stimulable phosphor sheet 11, which has thus been projected, is then conveyed out of the cassette 910 in the same manner as that in the eighth embodiment.

When the rotatable member 778 rotates in the manner described above, the clip 779 swings in the direction heading to the side rearward from the rotatable member 778 (i.e., it swings down in FIG. 31A). After the clip 779 thus swings to a predetermined position, it comes into contact with a stopper (not shown) located on the side of the rotatable member 778 and does not swing any more. In this manner, the relationship between the positions of the rotatable member 778 and the clip 779 ultimately becomes as shown in FIG. 31B. In this state, the clip 779 moves to push the stimulable phosphor sheet 11 forwardly.

During the housing of the stimulable phosphor sheet 11 in the cassette 910, the stimulable phosphor sheet 11 is conveyed by the nip rollers 445, 445 of the radiation image read-out apparatus 540 shown in FIG. 25 to the position shown in FIG. 31B. As a result, the end of the stimulable phosphor sheet 11 is clipped by the clip 779. Thereafter, the cassette 910 is pulled out of the radiation image read-out apparatus 540, and the rotatable member 778 is rotated from the position shown in FIG. 31B to the position shown in FIG. 31A by the spring 790. Also, the clip 779 moves rearwardly, and the stimulable phosphor sheet 11 clipped by the clip 779 is pulled to the position shown in FIG. 31A and is completely housed in the box member 12.

As can be understood from the foregoing, in the tenth embodiment, the movable member is constituted of the slider 14, the rod 777, and the rotatable member 778. The sheet transfer mechanism is constituted of the clip 779 and the spring 790.

Instead of the clip 779 being provided, the rotatable member 778 may be constituted of a magnetic material, and a stimulable phosphor sheet 11 having a magnetic material secured to the back surface may be adhered to the rotatable member 778. In this manner, the stimulable phosphor sheet 11 may be fed out of and into the box member 12. In such cases, the entire area of the stimulable phosphor sheet 11 can be utilized as the recording area. Also, even if the stimulable phosphor sheet 11 is clipped by the clip 779, the end of the sheet 11 will not be curved so as to separate from the inner surface of the bottom of the cassette 910 and will not become scratched or damaged. This also applies to the ninth embodiment described above.

In the cassette 710 of the eighth embodiment, the two side end faces of the stimulable phosphor sheet 11 are pushed by the rollers 774, 774, and the sheet 11 is thereby fed out. Therefore, the effects of defining the position of the stimulable phosphor sheet 11 with respect to the width direction thereof can also be obtained with the rollers 774, 774.

The eighth, ninth, and tenth embodiments of the cassette in accordance with the present invention are also applicable when an image recording medium other than the stimulable phosphor sheet is housed in the cassette. In cases where an image recording medium, such as X-ray photographic film, is processed, a magnetic material may be contained in the film base such that the aforesaid sheet transfer mechanism utilizing the engagement by magnetic attraction may be employed.

The eighth, ninth, and tenth embodiments of the cassette in accordance with the present invention are also applicable when the cassette is not provided with the largely swinging cover member and is provided with a slit-like opening, through which the image recording medium is to pass, at the front end such that the opening may be closed by a light blocking cloth type of cover member, or the like.

What is claimed is:

1. A device for conveying an image recording medium out of a cassette, said cassette comprising a box member for housing an image recording sheet, the box member having an opening formed therein through which the image recording member can be fed and a cover pivotably mounted on the box member to open and close the box member by pivoting about an axis, said device comprising:

a frame;

a sheet take-out mechanism comprising a rotating member mounted to said frame external to the box member, a roller arm, one end of the roller arm being supported by said rotating member, a roller supported on the other end of the roller arm, said roller moving between a waiting position and a sheet take-out position when said rotating member rotates;

a cover opening arm pivotably supported by said frame at one end of said cover opening arm, the other end of said cover opening arm coming into contact with at least one of said roller arm and said roller as said roller moves to said sheet-take-out position to thereby move from a closed position to a cover-opening position, said cover opening arm contacting said cover and pivoting said cover to an open position as said cover opening arm moves to the cover-opening position.

2. A device as recited in claim 1, further comprising:

drive means coupled to said roller; and means for activating said drive means when said roller is in the sheet take-out position to cause said sheet to move out of the cassette.

3. A device as recited in claim 2, wherein said cover opening arm has a hook formed on the other end thereof, said hook engaging the cover when said cover opening arm is moved to the cover-opening position.

4. A device as defined in claim 1 wherein the image recording medium is a stimulable phosphor sheet.

5. A device as defined in claim 1 wherein the image recording medium is photographic film.

* * * * *